United States Patent [19]
Penner et al.

[11] Patent Number: 5,276,743
[45] Date of Patent: Jan. 4, 1994

[54] LANGMUIR-BLODGETT FILMS IN A WAVEGUIDE OPTICAL PICK-UP HEAD USING MACH-ZEHNDER INTERFEROMETERS

[75] Inventors: Thomas L. Penner, Fairport; Nancy J. Armstrong, Ontario; Joseph F. Revelli, Jr., Rochester, all of N.Y.

[73] Assignee: Eastman Kodak Company, Rochester, N.Y.

[21] Appl. No.: 24,717

[22] Filed: Mar. 1, 1993

[51] Int. Cl.$^5$ .............................................. G02B 6/10
[52] U.S. Cl. ........................................... 385/14; 385/8; 385/9; 385/132; 385/145
[58] Field of Search ...................... 385/14, 2, 3, 8, 9, 385/122, 123, 132, 141–145, 130

[56] References Cited

U.S. PATENT DOCUMENTS

| | | | |
|---|---|---|---|
| 4,431,263 | 2/1984 | Garito | 385/122 |
| 4,672,187 | 6/1987 | Fujita et al. | 250/201 |
| 4,792,208 | 12/1988 | Ulman et al. | 350/96.34 |
| 4,798,437 | 1/1989 | Rediker et al. | 350/96.14 |
| 4,946,235 | 7/1990 | Scozzafava et al. | 350/96.34 |
| 4,948,225 | 8/1990 | Rider et al. | 350/96.34 |
| 4,955,977 | 9/1990 | Dao et al. | 350/96.34 |
| 4,971,426 | 11/1990 | Schildkraut et al. | 350/385 |
| 5,155,791 | 10/1992 | Hsiung | 385/130 |

FOREIGN PATENT DOCUMENTS 3536497 10/1985 Fed. Rep. of Germany .
3534776 4/1986 Fed. Rep. of Germany .

*Primary Examiner*—Frank Gonzalez
*Assistant Examiner*—John Ngo
*Attorney, Agent, or Firm*—Raymond L. Owens

[57] ABSTRACT

An integrated optical head has first and second channels forming an interferometer. A electro-optically phase-shiftable waveguide channel is associated with one of the first and second channels of the interferometer for electro-optical phase shifting of one channel with respect to the other channel. The interferometer is formed on a silicon substrate and the phase-shiftable waveguide channel is formed of Langmuir-Blodgett thin-film electro-optic polymers described on the silicon substrate.

13 Claims, 7 Drawing Sheets

LANGMUIR-BLODGETT FILMS IN A WAVEGUIDE OPTICAL PICK-UP HEAD USING MACH-ZEHNDER INTERFEROMETERS

TECHNICAL FIELD OF THE INVENTION

The present invention relates generally to an Integrated Guided Wave Optical Head (IGWOH) for reading information from and writing information onto optical data storage disks. More specifically, it relates to an integrated optical head that uses Mach-Zehnder interferometer wavefront sensor apparatus for determining focus and tracking errors that has nonlinear optical (NLO) material incorporated in or deposited on one arm for voltage controlled tuning of the phase retardation.

BACKGROUND OF THE INVENTION

Optical heads, whether of the bulk or integrated optic variety, must provide at least three separate functions. First of all, it must retrieve the data signal encoded on the light reflected off of the optical disk. Second, it must measure tracking errors that are displacement errors associated with motion of the disk in the plane of the disk. Finally, it must measure focus errors that are displacement errors associated with motion of the disk in a direction perpendicular to the plane of the disk. Integrated Guided Wave Optical Heads (IGWOH) represent compact, low mass alternatives to bulk optical head assemblies for reading and writing information on optical data storage disks.

U.S. Pat. No. 4,798,437 discloses a method and apparatus for processing analog optical wave signals. This patent describes the use of Mach-Zehnder (M-Z) interferometer arrays formed on inorganic electro-optic substrates, such as $LiNbO_3$ for example, to analyze wavefront profiles. Among the devices mentioned is an integrated optical waveguide range finder wherein free space radiation from a point source is end-fire coupled into an array of channel waveguides. The distance of the point source from the analyzer determines the curvature of the wavefront incident on the analyzer. Portions of the wavefront falling on adjacent channel waveguides are shifted slightly in phase due to this curvature. Adjacent channels are joined together at a Y-junction and the relative phase shift results in interference between light from these two channels. The signal exiting the interferometer, when taken together with the signals from other interferometers in the array, provide a measure of the wavefront curvature and hence of the distance to the source. Other light signals provide intensity reference levels. Control electrodes permit electro-optical phase-shifting of one channel with respect to the other. This feature provides a means of compensating for slight differences in the optical path lengths of the two channels or of biasing one channel with respect to the other.

It is desirable to use newer technology and have waveguides formed from new thin-film electro-optic polymers deposited on silicon substrates and to integrate electronic functions such as photodetection, amplification, and switching with the optic functions. Current conventional bulk heads for readout of optical data are limited in performance by weight and physical size. Integrated optic heads offer the possibility of low weight, compact size, and higher performance. A co-filed application entitled *Waveguide Optical Pick-Up Head Using a Mach-Zehnder Interferometer Wavefront Sensor*, which is incorporated herein by reference, descries an integrated optic waveguide pick-up head which can be more easily fabricated than prior art integrated optic heads. It is necessary to impose a $\pm 90°$ phase retardation on one arm relative to the other of each channel waveguide Mach-Zehnder (M-Z) interferometer in order for the device to function properly. A non-linear optical material exhibiting the so-called linear electro-optic or Pockels effect is incorporated in or deposited on top of one arm of each M-Z interferometer and permits voltage controlled tuning of the phase retardation. Inorganics such as $LiNbO_3$ and organics such as spin-coated azo-benzene sulfone dye co-polymer are examples of suitable non-linear optic materials.

The idea of using M-Z interferometers to sense focus error in a waveguide optical pick-up head was advanced in the co-filed application. The use of the Langmuir-Blodgett (L-B) technique as a means of forming optically transparent poled films of noncentrosymmetric molecules was advanced by Penner, et al., in co-pending application Ser. No. 07/735,550, filed Jul. 25, 1991 entitled *Improved Conversion Efficiency Second Harmonic Generator*. It is desirable to extend the use of L-B films to include use as the nonlinear optical medium in one arm of M-Z interferometers used in waveguide optical pick-up heads.

SUMMARY OF THE INVENTION

Briefly summarized, according to one aspect of the invention, an integrated optical head has first and second channels forming an interferometer. A control electrode is associated with one of the first and second channels of the interferometer for electro-optical phase shifting of light guided in one channel with respect to the light guided in the other channel. The interferometer is formed on a $SiO_2$-coated silicon substrate, and the electronically controlled phase-shiftable channel waveguide is formed on Lanmuir-Blodgett thin-film electro-optic polymers deposited on one channel waveguide branch of the interferometer.

The integrated optic head comprises a planar waveguide, channel waveguides, a waveguide condensing lens, and integrated waveguide photodetectors. The beam returning from the disk is coupled into a planar optical waveguide by a grating coupler. The main portion of this beam is focused by a waveguide condensing lens onto an integrated waveguide photodetector to provide the data signal. A smaller portion of the beam is sampled by channel waveguide M-Z interferometers. The present invention includes organic nonlinear optical materials formed as Langmuir-Blodgett (L-B) films as an alternative Pockels nonlinear optic medium for the M-Z interferometer optical pick-up head. The channel waveguides that comprise the M-Z interferometers can be electro-optically tuned after fabrication. The net result is that the integrated optic head is far more easily mass-manufactured because of its reduced sensitivity to fabrication error.

The present invention includes waveguides formed from electro-optic polymer formed as L-B films on silicon substrates, upon which $SiO_2$ or some other transparent low index buffer layer and high index passive planar and channel waveguides have been formed. The use of the silicon substrate allows for the custom integration of electronic functions such as photodetection, amplification, and switching with the optic functions.

DETAILED DESCRIPTION OF THE PREFERRED EMBODIMENTS

Figure 1:
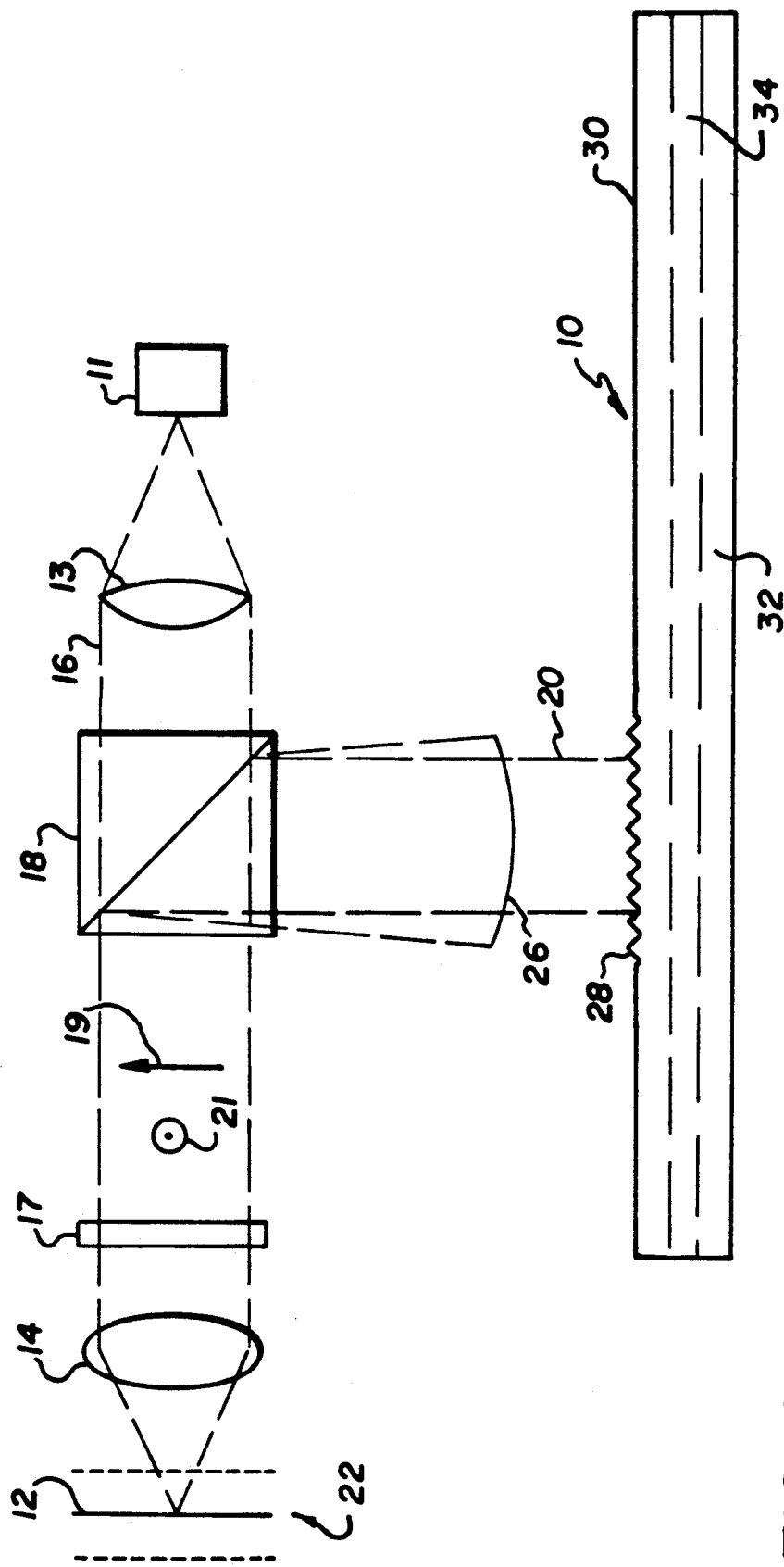
FIG. 1 is a diagrammatic side view of a preferred embodiment of a waveguide read/write head using a polarization beam splitter and quarter-wave plate, laser-diode, optical disk, and objective lens in accordance with the present invention.
Figure 2:
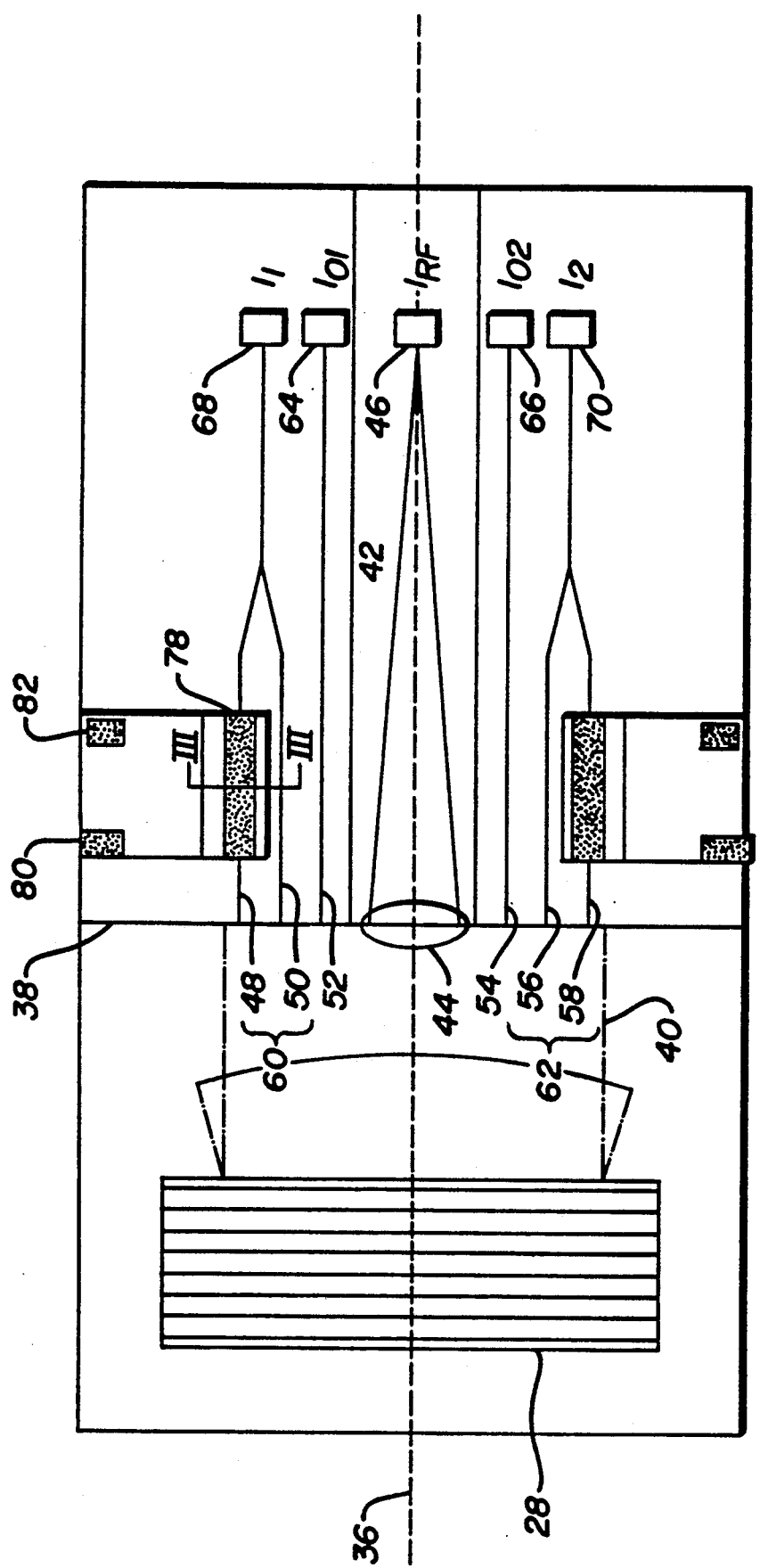
FIG. 2 is a plan view of the waveguide pick-up head illustrated in FIG. 1.

Referring now to the drawings, in which like numerals indicate like elements throughout the several drawing figures, FIGS. 1 and 2 illustrate a waveguide optical read/write head 10. FIG. 1 is a side view of the waveguide pick-up head 10 along with the optical disk 12, objective lens 14, and laser diode 11 and collimating lens 13.

Referring to FIG. 1, a beam of light from laser diode 11 is converted to collimated beam 16 by collimating lens 13. The polarization beam splitter 18 reflects a s-polarized light and transmits p-polarized light so that the linear polarization state of light incident on quarter-wave plate 17 shown by 19. The quarter-wave plate 17 changes the linearly polarized light to circularly polarized light and this beam is focused by means of objective lens 14 onto the information bearing surface of the optical disk 12. Upon reflection from the surface of the optical disk 12, the intensity of the light is modulated according to the information recorded thereon. The light is recollimated by objective lens 14 provided the disk surface 12 and the objective lens 14 are separated by a distance equal to the focal length of the objective lens 14. This collimated light is converted from circularly polarized light to linear polarized light which is rotated 90 degrees relative to the polarization state 19 as indicated by 21. Polarization state 21 is totally reflected from polarization beam splitter 18 because it is s-polarized. Beam 20 is then incident on the optical waveguide 10. The purpose of the quarter-wave plate and polarization beam splitter is to ensure optical isolation of the laser diode 11; that is, to ensure that none of the light reflected from the optical disk surface 12 returns to the laser diode 11. This means of isolation is well-known in the art and it serves not only to prevent laser diode feedback noise but also to maximize the amount of light available to be detected as signal.

Beam 20 is characterized by planar wavefronts 22 when it is collimated. Relative movement of the disk surface 12 from this nominal position (i.e., defocus) results in decollimation of beam 20 and curved wavefronts 26. Beam 20 is coupled by means of grating coupler 28 into a planar optical waveguide 30.

The planar waveguide 30 is thin enough for single mode operation at the wavelength of light employed. Typically, this would require 0.5 to 2 mm film thickness. This film can be composed of any of a number of transparent, high refractive index, materials, such as, for example, RF sputtered Corning 7059 glass, ion-exchanged KB7 glass, chemical vapor deposited (CVD) SiOxNy, or even organic films such as spin-coated non-linear optic azo-benzene sulfone dye co-polymer, PMMA (polymethylmetacrylate), evaporated organic monomer glasses, or a Langmuir-Blodgett film. This waveguide material is deposited on top of a transparent buffer layer 34 of low infractive index. Thin films 30 and 34 are supported by substrate 32.

If silicon is chosen as the substrate 32, a sputtered or thermally-grown layer of $SiO_2$, 1 to 3 microns in thickness, must be deposited directly on the silicon to serve as a transparent, low refractive index buffer layer 34. The silicon substrate 32 permits custom electronic functions such as detectors, amplifiers, transistors, etc. to be fabricated monolithically on the same substrate as the optical functions. Photodetectors which have been integrated with optical waveguides on silicon substrates are known in prior art. See German Patent Documents DE 35 36 497 A1 and DE 35 34 776 A1, and U.S. Pat. No. 4,672,187. Alternatively, buffer layer 34 can be omitted and the substrate 32 and waveguide 30 can be formed by indiffusion of titanium into a planar slab of electro-optic $LiNbO_3$. The materials specified for the various layers are by no means meant to be exclusive. Other materials with similar properties can also be used.

Referring to FIG. 2, the device 10 is symmetric about the optical axis 36 and the planar waveguide 30 is modified beyond line 38. Beyond line 38, the beam 40 in waveguide 30 is coupled into discrete channels formed in the planar waveguide 30 either by ion milling, ion diffusion, (in the case of $LiNbO_3$), or ion exchange techniques. The center portion of beam 40 is coupled into central channel 42. This channel is wide enough (i.e., 1-5 mm wide) that light propagates as a free wave in the transverse direction in this region and is focused by waveguide lens 44 onto waveguide photodetector 46. The temporal variation of the output photocurrent of this detector 46, $I_{RF}$, is a direct measure of the data recorded on the optical disk 12 (the so-called "rf" signal).

The outer portions of beam 40 are coupled into channel guides 48, 50, 52, on one side of center guide 42, and 54, 56, and 58 on the other. Single mode channel waveguide pairs 48, 50 and 56, 58 form two M-Z interferometers 60, 62 that are disposed synmmetrically about center channel 42. These single mode channels are typically 0.5 to 5 microns wide. Photocurrents $I_{01}$ and $I_{02}$ that are measured at the ends of waveguide channels 52 and 54 by photodetectors 64, 66 serve as reference signals for the two interferometers 60, 62. Furthermore, the difference in these two photocurrents provides the tracking error signal, $I_{TES} = I_{02} - I_{01}$. The reference channels 52 and 54 need not necessarily be single mode waveguides and can be 0.5 micron to 1 mm wide. All photodetectors 46, 64, 66, 68, 70 can be integrated into the silicon when silicon is chosen as the substrate 32.

At least a portion of waveguide channels 48 and 58 are formed of electro-optic organic or inorganic materials. Examples of organic material are poled PMMA/azo-benzene sulfone dye co-polymer and Langmuir-Blodgett films. An example of an inorganic material is LiNbO$_3$.

Figure 3:
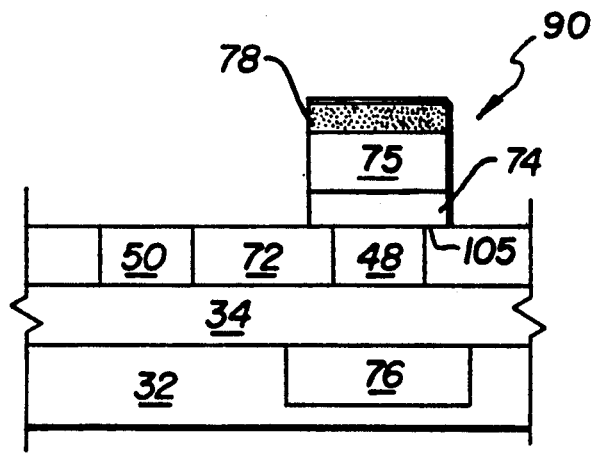
FIG. 3 is a diagrammatic sectional view taken along line III—III of FIG. 2.
Figure 4:
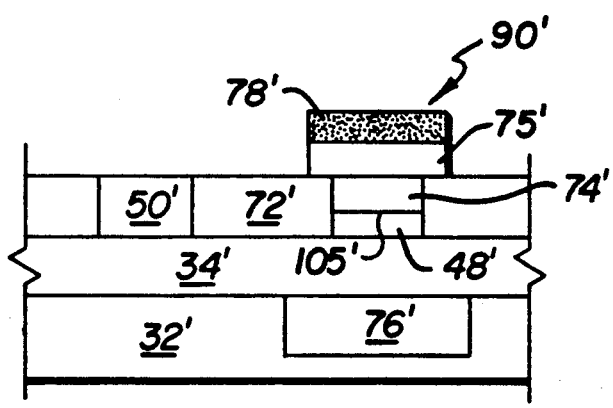
FIG. 4 is a sectional view similar to FIG. 3, but illustrating another preferred embodiment.
Figure 5:
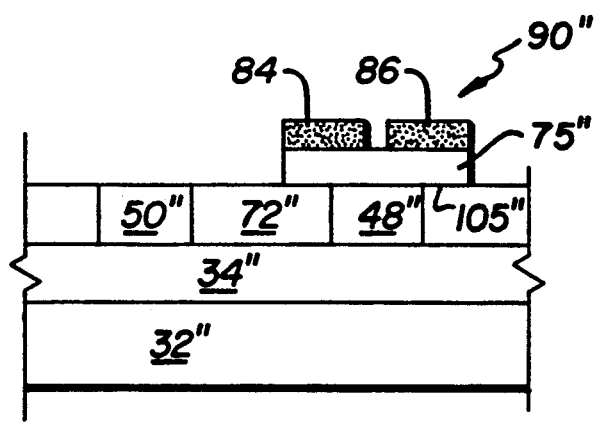
FIG. 5 is a sectional view similar to FIGS. 3 and 4, but illustrating another preferred embodiment.

FIGS. 3-5 illustrate means of incorporating electro-optic material in channel waveguides formed by the ion exchange process. These diagrams represent cross-sectional views through section III—III in FIG. 2. In these figures 72 represents the non-guiding (lower index) glass, 48 and 50 represent the guiding (higher index) ion-exchanged glass channels. Channel waveguides formed by other techniques can also be used. FIG. 3 shows a means of incorporating an organic electro-optic material by depositing the material in a thin film 74 directly on top of waveguide channel 48. Alternatively, a portion of channel 48' could be removed by ion-milling or reactive ion etching and filled with the organic NLO material as shown in FIG. 4.

A pair of electrodes 76, 78 (see FIGS. 2-4) are disposed on either side of NLO layer 74. These electrodes are provided to apply an electric field across the electro-optic material. If the substrate 32 is silicon, the lower electrode 76 can be formed by a p+ doped region of the silicon substrate 32 to which ohmic contact is made. Connection to external drive voltage is made via contact pads 80 and 82 (See FIG. 2). Transparent buffer layers 75 and 34 serve to optically isolate the channel waveguide and NLO film from the metal electrodes.

FIG. 5 shows an alternative means of applying electrodes 84, 86 that is appropriate for Ti-exchanged LiNbO$_3$ channel waveguides. Electrodes 84 and 86 are positioned on either side of Ti-exchanged channel 48" on a transparent buffer layer 75". The buffer layer 75" serves to optically isolate the channel waveguide 48" from the metallic electrodes 84, 86. When a control voltage is applied across the electrodes, electric fringing fields in the region between the electrodes generate the index change in the electro-optic material.

Although the surface electrode configuration shown in FIG. 5 is used with LiNbO$_3$ waveguides, it can also be used with the organic electro-optic waveguides. The resultant electro-optic phase modulator 90 permits adjustment of the retardation of the light passing through this arm of the interferometer. This phase adjustment is useful to bias the operating point of the interferometer to a linear region. A similar modulator is formed on waveguide channels 48 and 58.

As shown in FIG. 2, guided beam 40 propagates with a straight or curved wavefront according to whether the disk 12 is in or out of focus. Wavefront curvature results in a phase difference between portions of beam 40 that couple into adjacent branches of the two M-Z interferometers 60, 62. An interference signal is generated by this phase difference. Consequently, $$I_{FES} = \frac{I_2}{I_{02}} - \frac{I_1}{I_{01}}$$

is generated that is related directly to the defocus, $\Delta$. Defocus, $\Delta$, is the displacement of the disk from the nominal location which is equal to the focal length away from the objective lens 14 in FIG. 1. It is indicated by the displacement arrows 24 in FIG. 8.

Figure 8:
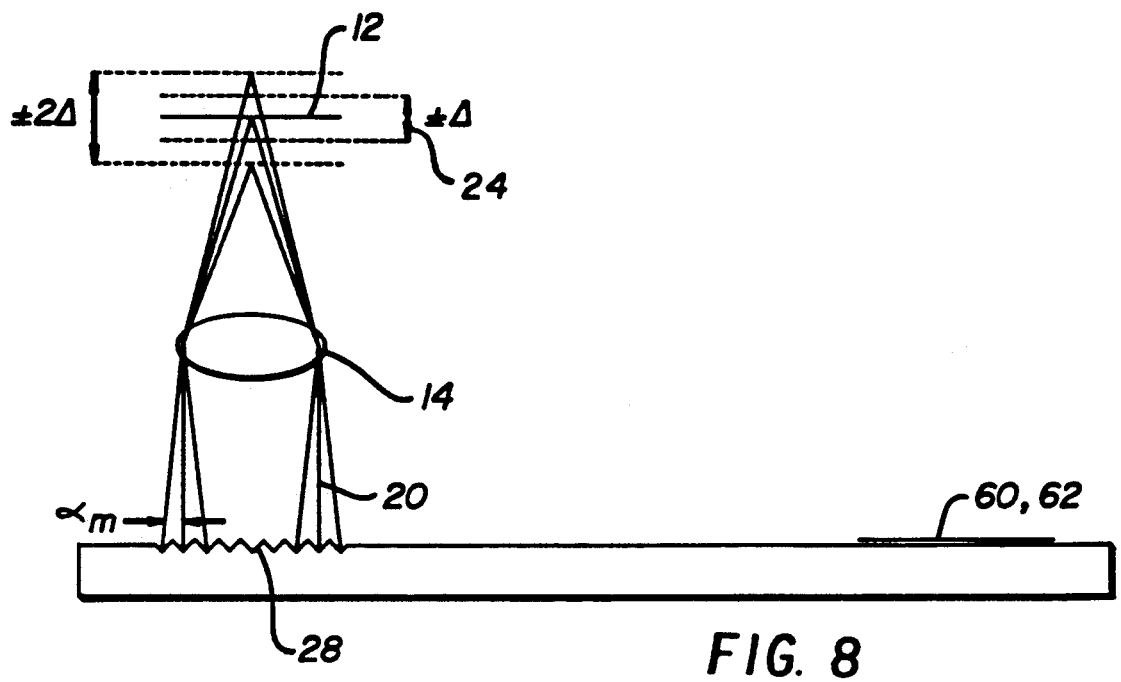
FIG. 8 is a diagrammatic side view of the waveguide read/write head and optical disk of FIG. 1 illustrating the effects of optical disk motion on the collimation beam returning to IGWOH from objective lens.
Figure 9:
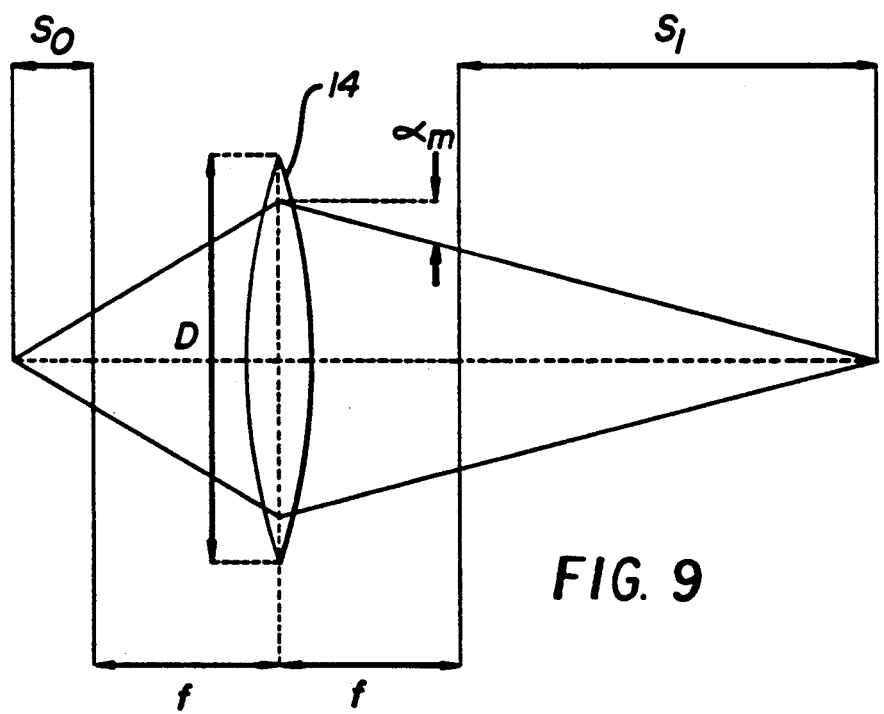
FIG. 9 is a diagrammatic top view of the objective lens of FIG. 8 illustrating the location of the image and object planes.

FIGS. 8-11 illustrate the operational principles of an IGWOH. FIG. 8 shows a side-view of the IGWOH along with optical disk and objective lens. An expression relating the vertical disk displacement (defocus) to the signal detected in the M-Z interferometer can be derived. When the disk surface is in the nominal position, one focal length from the objective lens, the light reflected from the disk is collimated by objective lens 14. However, if the disk is displaced by a distance $\pm\Delta$, light reflected from the disk appears to originate from an objective plane which is located $\pm 2D$ from the nominal position. The Newtonian form of the lens equation yields an expression relating the locations of the image and object planes:

$$s_1 = \frac{f^2}{2\Delta},$$

where $s_1$ is the distance from the image plane to the back focal point of the objective lens, and f is the focal length of objective lens (see FIG. 9). The divergence angle, $\alpha_m$, of the marginal ray is approximated by $$\alpha_m = \frac{D}{2(f + s_1)} = \frac{D\Delta}{f(f + 2\Delta)},$$

where D is the diameter of the objective lens. Rays other than the marginal ray have smaller divergence angles, $$\alpha = \frac{2\alpha_m r}{D},$$

where r is the radius of the ray in the objective lens exit pupil.

Figure 10:
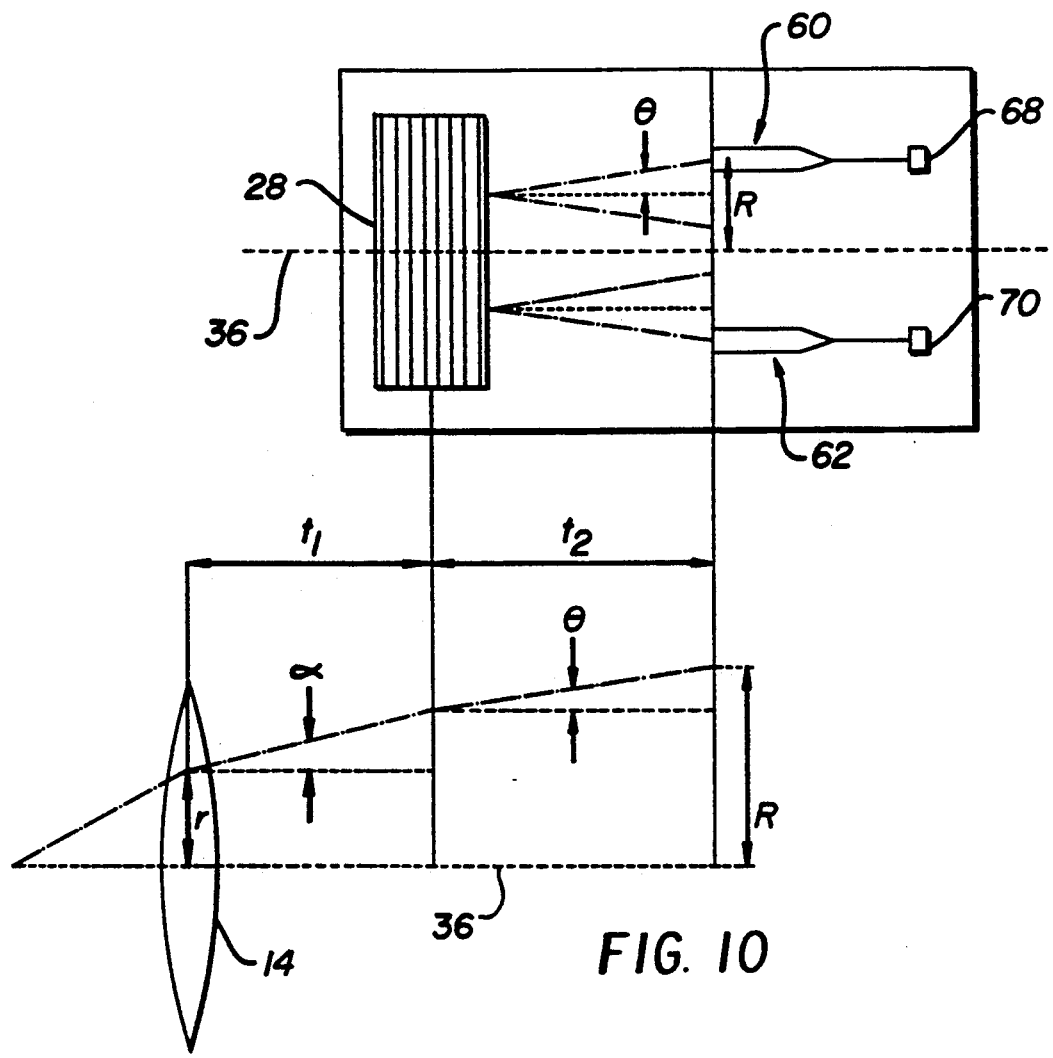
FIG. 10 is a diagrammatic top view of the waveguide and objective lens of FIG. 8 with an inset illustrating the optical axis unfolded so that the side view of the objective lens is coplanar with the waveguide device.

Light returning from the disk is coupled into the IGWOH by a grating coupler. The divergence angle in the waveguide, $\theta$, can be related to the angle $\alpha$ by the expression $$\theta = \frac{\alpha}{n_{eff}},$$

where $n_{eff}$ is the effective index of the guided mode (see FIG. 10). Light in the planar waveguide portion of the head is coupled into two sets of channel waveguides that form a pair of M-Z interferometers. These interferometers are disposed symmetrically a distance R on either side of the optical axis.

Referring to FIG. 10, the following expression can be derived relating to q or D $$R = r + \theta n_{eff}\left(t_1 + \frac{t_2}{n_{eff}}\right)$$

$$= \frac{\theta(n_{eff})f(2\Delta + f)}{2\Delta} + t_1 + \frac{t_2}{n_{eff}}$$

where $t_1$ is the distance between the objective lens and the grating coupler and $t_2$ is the distance between the grating coupler and lines 38. Solving for $\theta$ yields $$\theta = \frac{\frac{2R\Delta}{n_{eff}}}{f(2\Delta + f) + 2\Delta\left(t_1 + \frac{t_2}{n_{eff}}\right)}.$$

Figure 11:
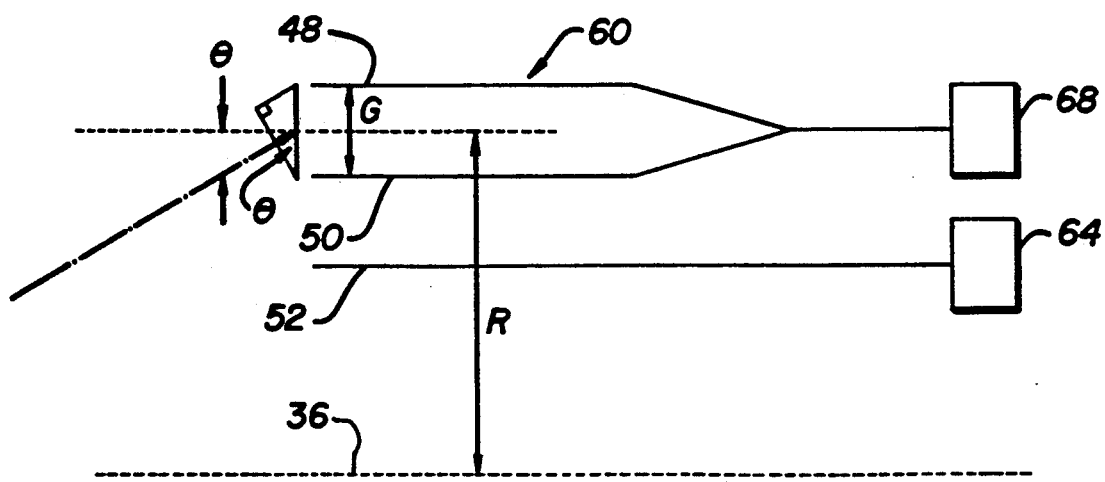
FIG. 11 is a more detailed view of an individual M-Z interferometer of FIG. 10.

FIG. 11 is a detailed view of an individual M-Z interferometer. It can be seen that the relative optical path difference (OPD) between rays that are incident at an angle $\theta$ on the two adjacent channel waveguides of the M-Z interferometer that are joined at a Y-junction is given by the equation $$OPD = n_{eff}G\sin\theta \approx n_{eff}G\theta$$

where G is the separation between the two channel waveguides of the M-Z interferometer. The phase shift corresponding to this OPD is given by $$\Phi = \frac{2\pi}{\lambda} OPD$$

$$\approx \frac{\frac{2\pi G}{\lambda} 2R\Delta}{f(2\Delta + f) + 2\Delta\left(t_1 + \frac{t_2}{n_{eff}}\right)}$$

$$= \frac{\frac{2\pi G}{\lambda} 2R\Delta}{f^2 + 2\Delta\left(t_1 + \frac{t_2}{n_{eff}} + f\right)}$$

$$= \frac{2\pi G}{\lambda} \Delta \frac{2R}{f^2(1 + Q)}$$

If it is further assumed that the quantity $$Q = \frac{2\Delta\left(t_1 + \frac{t_2}{n_{eff}} + f\right)}{f^2}$$

is much less than 1, the last equation above can be further simplified to $$\Phi = \frac{2\pi G}{\lambda} \frac{2R}{f^2} \Delta.$$

In this approximation, the phase shift is linear in the disk displacement.

The intensity of light exiting an individual M-Z interferometer can be specified in terms of the phase shift $\Phi$:

$$I_1 = I_{01}[1 + \cos(\Phi + \Phi_0)],$$

where $I_{01}$ is the intensity measured by the photodetector at the end of the straight reference channel guide, and $\Phi_0$ is the bias phase shift between light in the two parallel channels of the interferometer. $\Phi$ is the phase difference between rays arriving at the two parallel channel waveguides and is a function of the defocus, $\Delta$, as shown by the equation $$\Phi \approx \frac{2\pi G}{\lambda} \frac{2R}{f^2} \Delta.$$

If $\Phi_o$ is adjusted to be 90°, then $$I_1 = I_{01}[1 - \sin\Phi].$$

A bias shift of 90° is chosen so that positive and negative values of $\Delta$ can be distinguished by observing the sign of $I_1$.

Finally, when the second M-Z interferometer located on the opposite side of the optical axis is biased $-90°$ and the signal of one of the interferometers is subtracted from the other, a differential signal, $I_{FED}$, is obtained $$I_{FES} = \frac{I_2}{I_{02}} - \frac{I_1}{I_{01}}$$

$$= 2\sin\Phi \approx 2\sin\left[\frac{2\pi G}{\lambda} \frac{2R}{f^2} \Delta\right]$$

$$= 2\sin\frac{2\pi\Delta}{A}$$

where $$A = \frac{1}{\left(\frac{G}{\lambda}\right)\left(\frac{2R}{f^2}\right)} = \frac{\lambda f^2}{2RG}$$

Thus, $I_{FES}$ represents the focus error signal and varies sinusoidally with the defocus parameter, $\Delta$. Thus, by biasing the two M-Z interferometers ±90° and taking the differential signal, two desired effects can be achieved simultaneously; namely, the DC level is suppressed and the output signal varies linearly with defocus (assuming $\Phi$ is less than one radian). Furthermore, the tracking error signal can be obtained from the differences in the reference signal:

$$I_{TES} = I_{02} - I_{01}$$

As indicated, $I_{FES}$ is periodic in $\Delta$. FES signals in conventional optical heads are usually non-periodic. More specifically, the conventional FES signal is zero until the objective lens and disk surface are within ten microns or so of best (i.e., nominal) focus separation. Within this range, the signal is positive on one side of focus, zero at best focus, and negative on the other side of focus. The question arises as to whether the period of the proposed FES signal generation scheme can be made large enough so there will be no ambiguity in the control signal due to the periodicity. This question can be answered by considering the following numerical example wherein:

f = 4 mm
G = 20 microns
$\lambda$ = 1 micron
R = 1 mm
$n_{eff}$ = 1.5
$t_1$ = 2 mm
$t_2$ = 5 mm Using these values for the various input parameters, the period, A, of the M-Z-interferometer signal can be calculated directly using the definition of A.

$$A = \frac{\lambda f^2}{2RG}$$

The maximum excursion range, $\pm\Delta_{max}$, is given by $$\pm \Delta_{max} = \pm \frac{\lambda}{4} = \pm \frac{\lambda f^2}{8RG} = \pm 100 \text{ microns}$$

which is large enough to avoid ambiguity for typical optical disk defocus ranges. The quantity $\Delta_{max}$ can easily be made smaller by increasing either R or G. The shorter period of the FES signal increases the sensitivity of the device to defocus.

Advantage may be taken of this face to obtain a device to measure the FES over both coarse and fine ranges of defocus. Of course, $\Delta_{max}$ can also be made larger by decreasing R or G, but larger values of $\Delta_{max}$ will affect the validity of the linear approximation, $$\Phi \approx \frac{2\pi G}{\lambda} \frac{2R}{f^2} \Delta.$$

This can be demonstrated by computing the parameter Q using the input parameters given above, $$Q = \frac{2\Delta_{max}\left(t_1 + \frac{t^2}{n_{eff}} + f\right)}{f^2} \approx 0.12,$$

which is must less than 1 and justifies the use of the linear approximation, $$\Phi \approx \frac{2\pi G}{\lambda} \frac{2R}{f^2} \Delta.$$

On the other hand, if R is taken to b 0.25 mm, $\Delta_{max}$ increases to 400 microns and Q becomes 0.47. Although Q is still less than 1, the equation, $$\Phi \approx \frac{2\pi G}{\lambda} \frac{2R}{f^2(1+Q)} \Delta,$$

should really be used to determine $\Phi$. In this case, $\Phi$ is no longer linear in $\Delta$.

Figure 6:
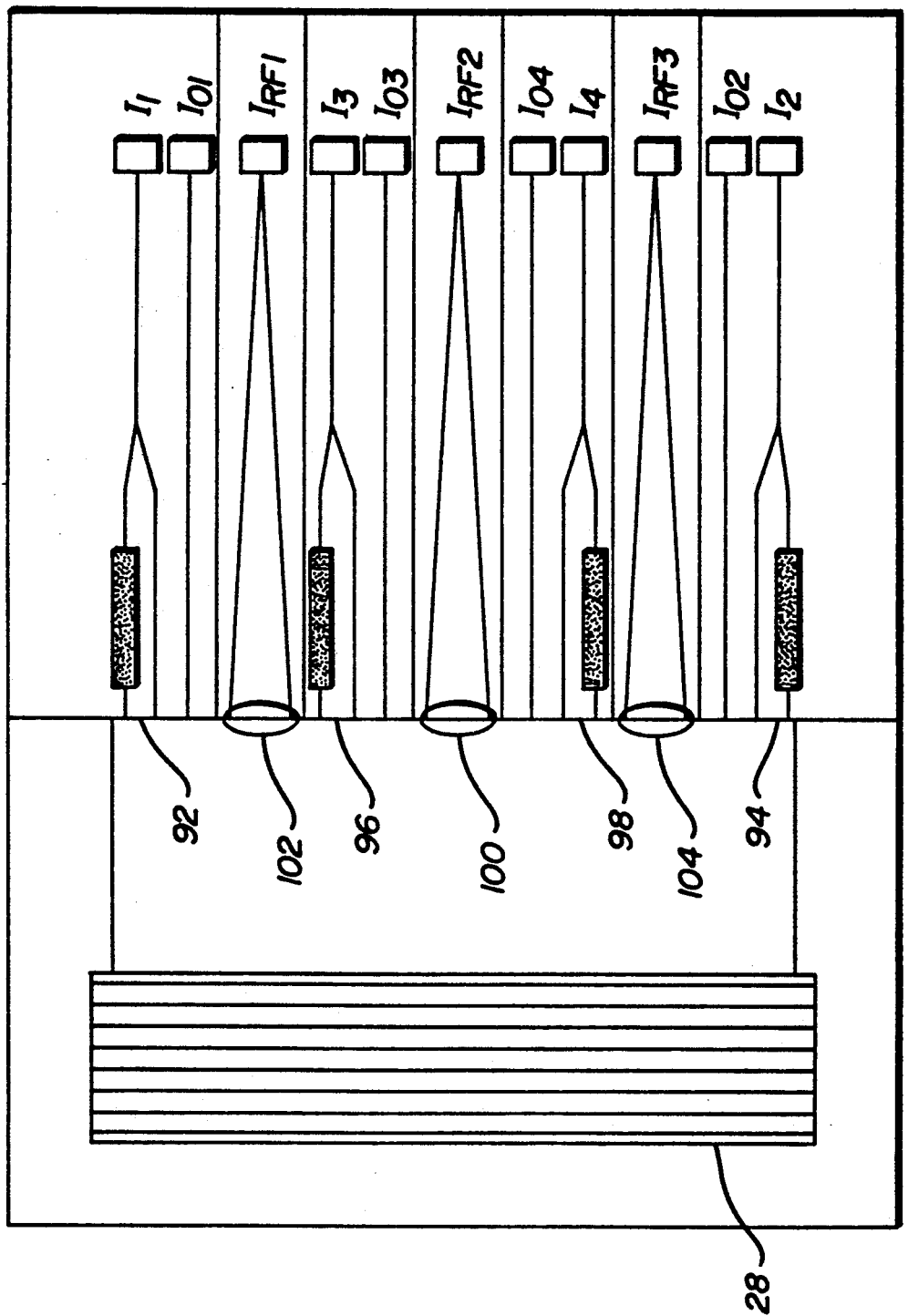
FIG. 6 is a diagrammatic plan view similar to FIG. 2 but illustrating another preferred embodiment with multiple interferometers.

Referring to FIG. 6, light returning from the optical disk 12 is coupled into the planar waveguide 30 by means of grating coupler 28. This alternative embodiment differs from the embodiment of FIG. 2 in that four M-Z channel waveguide interferometers 92, 94, 96 and 98 are used instead of two interferometers, and three waveguide lenses 100, 102 and 104 are used instead of one lens. The outer two M-Z interferometers 92, 94 are characterized by a different defocus excursion range, $\Delta_{max}$, from the inner two interferometers 96, 98. This is achieved by varying the RG product for the inner two interferometers 96, 98 relative to the outer two interferometers 92, 94. The coarse FES (small RG) is obtained from $$I_{FES,c} = \frac{I_4}{I_{04}} - \frac{I_3}{I_{03}},$$

and the fine FES (large RG) is obtained from $$I_{FES,f} = \frac{I_2}{I_{02}} - \frac{I_1}{I_{01}}.$$

The TES is given simply by $$I_{TES} = (I_{04} + I_{02}) - (I_{03} + I_{01}),$$

and the RF signal is given by $$I_{RF} = I_{RF1} + I_{RF2} + I_{RF3}.$$

Additional pairs of M-Z interferometers could be included for other excursion ranges.

Figure 7:
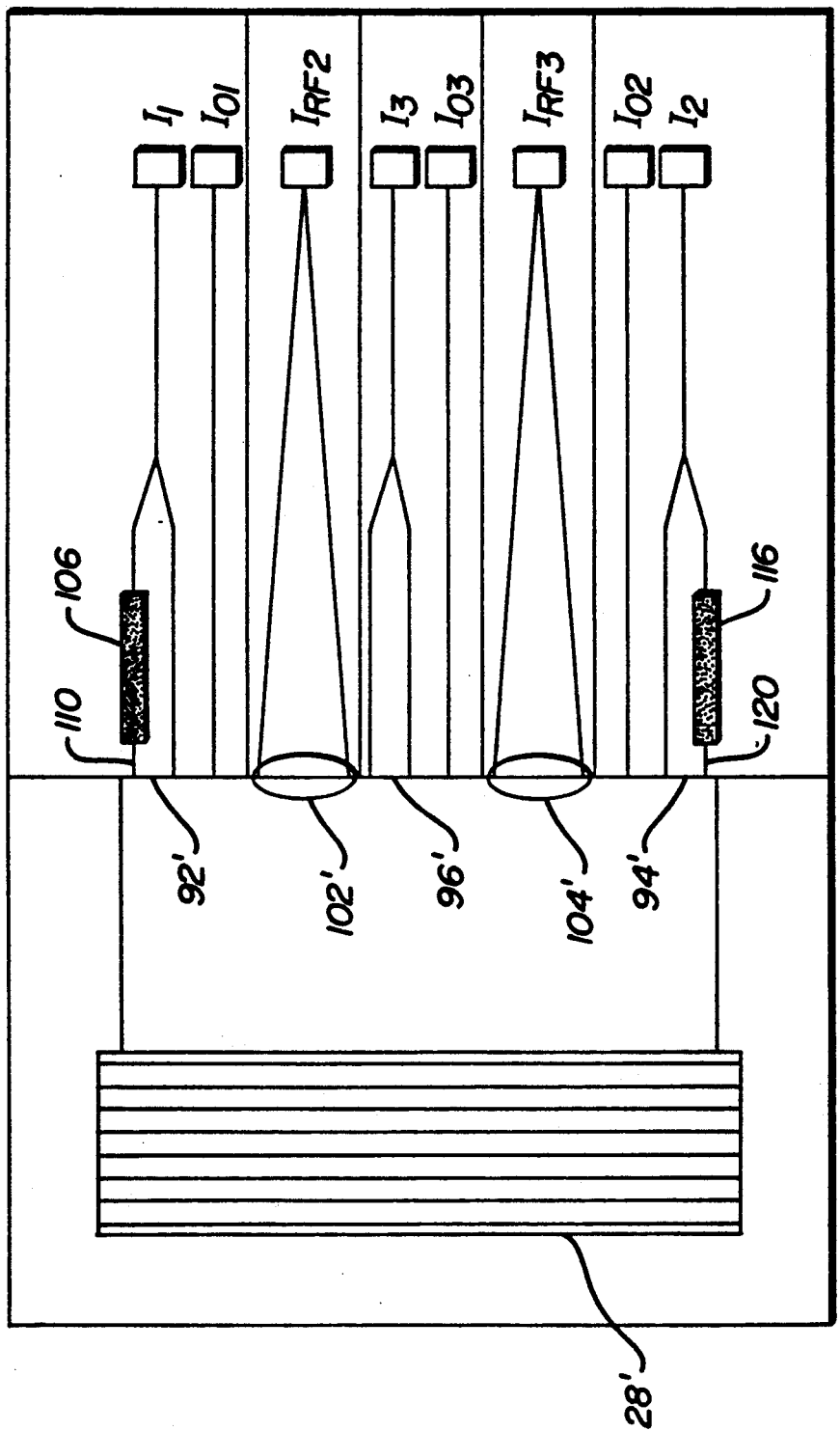
FIG. 7 is a plan view similar to FIGS. 2, and 6, but illustrating another preferred embodiment.

Normally, M-Z interferometers are sensitive to wavelength shift. This poses a serious difficulty if a semiconducting laser diode is used as a source because of wavelength shifts associated with longitudinal mode hops in most laser diodes. Another embodiment is illustrated in FIG. 7 that is self-correcting with respect to laser diode wavelength shift. A central M-Z interferometer 96' is positioned along the optical axis of the device. As in the fundamental embodiment, electrodes 106, 116 are deposited on electro-optic channel guides 110, 120 that form the variable-phase arms of two outer M-Z interferometers 92', 94', respectively. The counter electrodes for these phase modulators are positioned below the electro-optic channel guides. These channel waveguide phase-modulators permit dynamic alteration of the bias phase shift. Because the portion of the wavefront incident on the central M-Z interferometer 94' is always planar, the output signal of the interferometer, $$I_{FB} = \frac{I_3}{I_{03}},$$

provides an independent measure of the wavelength shift. Detection of this signal level can be sued to generate control voltages which, when applied to electrodes 106, 116, permit adjustment of the bias phase shifts of the two M-Z interferometers 94', 94', thereby compensating for wavelength shifts.

The present invention relates generally to an Integrated Guided Wave Optical Head (IGWOH) for reading information from and writing information onto optical data storage disks as set forth above. More specifically, it relates to an integrated wavefront sensor apparatus for determining focus and tracking errors that has nonlinear optical (NLO) material incorporated in or deposited on one arm for voltage controlled turning of the phase retardation. The present invention uses Langmuir-Blodgett layers as described below as the NLO material for phase retardation. Portions of the detailed description of co-pending application Ser. No. 07/735,550, filed Jul. 25, 1991 are incorporated hereinbelow.

Again referring to FIGS. 1-3, it can now be appreciated that there has been presented an integrated guided wave optical head for reading information from optical data storage disks, and a method for detecting the focus and tracking errors in the optical head. The device is comprised of a grating input coupler, a planar waveguide section, and a channel waveguide section as shown in FIG. 2. The channel waveguide section itself is comprised of two (or more) Mach-Zehnder (M-Z) interferometers 60, 62 disposed symmetrically about the optical axis 36 of the device. The beam returning from an optical data storage disk is coupled into a planar optical waveguide by means of a grating coupler (see FIG. 1). The main portion of this beam is focused by a waveguide condensing lens (44 in FIG. 2) onto an integrated waveguide photodetector to provide the data signal. A smaller portion of the beam is sampled by channel waveguide M-Z interferometers. These interferometers measure the beam wavefront curvature to provide the focus error signal (FES). Additional channel waveguides 52, 54 provide reference signals for the interferometers and provide a means of measuring the tracking error signal (TES).

FIG. 3 is a cross-sectional view of M-Z interferometer 60 taken along line III—III of FIG. 2. An undoped silicon substrate 32 lies below a $SiO_2$ buffer layer 34. Channel waveguides 48, 50 are formed by the ion-exchange process. A Lanmuir-Blodgett film has been formed so that the noncentro-symmetric molecules which comprise this film are oriented in the same direction. The axis of alignment for the molecules should be perpendicular to the plane of the waveguide. Candidate L-B materials will be discussed. Layer 75 is a top buffer composed of a compatible organic or inorganic material. Typically, buffer layers 34 and 75 should both be about 1 to 10 μm in thickness, the waveguide channels should be 0.5 to 5 μm thick and 0.5 to 5 μm wide, and the separation between channels should be 1 to 1000 μm. The L-B film should be 0.02 to 1 μm in thickness, 10 to 1000 μm wide, and 0.1 to 10 cm in length. A region of p+doped silicon 76 serves as the lower electrode for the electro-optic phase shifter 90. The upper electrode 78 can be formed by evaporating a thin metal film on top of buffer layer 75. Electrical contact is made to these two electrodes by means of pads 80, 82 shown in FIG. 2.

A primary advantage of this head over other integrated optic pick-up heads is the relatively wide latitude offered in fabrication. For example the tolerances associated with waveguide lens fabrication and alignment are reduce. Furthermore use of nonlinear optic media to effect voltage-controlled phase-retardation serves as an additional degree of freedom to permit compensation for the variability of intrinsic retardation from interferometer to interferometer. Finally, the use of L-B films as the nonlinear optical medium offers the possibility of high electro-optic coefficients and greater flexibility of fabrication compared to more traditional inorganic materials. These features permit the use of lower drive voltages and even cheaper and more compact devices than would otherwise be possible.

The construction of an optical article for precisely modulating the phase-front of a guided wave places stringent requirements on the nonlinear optical layer:

(a) The thickness of the nonlinear optical organic (NLO) layer must be at least 70 percent of the wavelength λ, the wavelength of light in free space which, for typical applications, is in the range of 1.0 μm to 300 nm.

(b) The NLO layer must be substantially transparent to λ.

(c) The NLO layer must exhibit an absolute electrooptic coefficient of at least 10 rm/v.

(d) The NLO layer must incorporate molecular dipoles which all have the same polarity. In particular, it will be appreciated that with polarization of the electromagnetic radiation so that the electric field is perpendicular to the major surface 105 in FIG. 3 (i.e., TM polarization) a more efficient interaction with the dipole of the L-B film is possible.

The molecules used to construct L-B films are ampiphiles; that is, compounds that contain at least one hydrophilic moiety (Hy), also commonly referred to as a head group, and at least one lipophilic moiety (L), also commonly referred to as a tail group, joined through a linking group (K). The first mono-molecular amphiphile layer deposited on the support surface 105 in FIG. 3 taken one of two possible orientations, depending upon whether the support surface is hydrophilic or lipophilic:

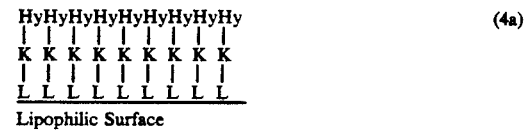

(4a)

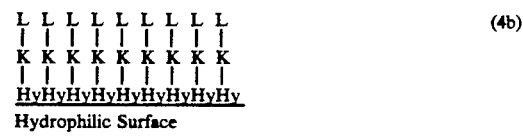

(4b)

To achieve high second order polarizabilities, $\chi^{(2)}10^{-9}$ esu, it is necessary that a high proportion of the amphiphile layers used to construct the L-B assemblies contain a molecular dipole linking group (M). For a linking group to be considered a molecular dipole linking group its second order polarizability, $\beta$, must be greater than $10^{-30}$ electrostatic units (esu). The following reflects the inclusion of a molecular dipole:

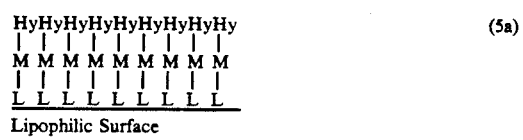

(5a)

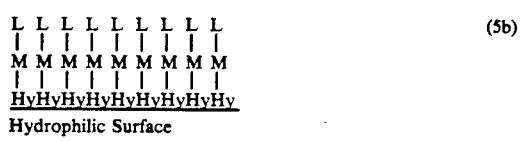

(5b)

Each molecular dipole in turn is comprised of at least one electron donor (D), at least one electron acceptor (A) and a linking group (E), specifically a conjugated $\pi$bonding system, which provides a pathway for charge transfer resonance between A and D:

(6)

Taking into account the orientation of the molecular dipole M in the amphiphile, relationships 5a and 5b can be expanded into four relationships:

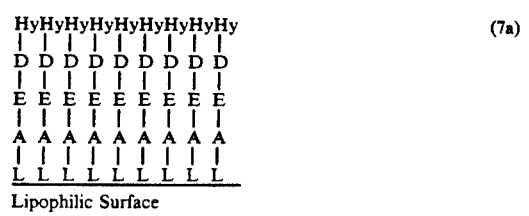

(7a)

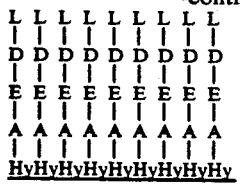
Hydrophilic Surface (7b)

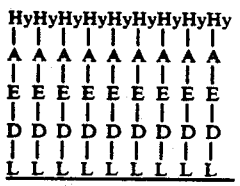
Lipophilic Surface (7c)

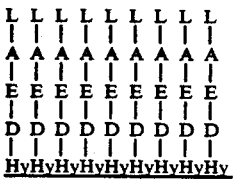
Hydrophilic Surface (7d)

Although the amphiphiles have been shown above as monomeric compounds, it is appreciated that the amphiphiles can be repeating units in a polymer, where the backbone of the polymer serves as the hydrophilic moiety Hy or the lipophilic moiety L. The following reflects polymeric linkage (—) of the amphiphiles:

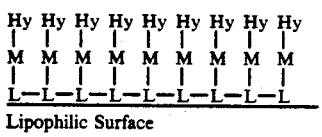
Lipophilic Surface (8a)

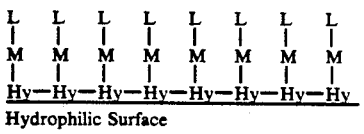
Hydrophilic Surface (8b)

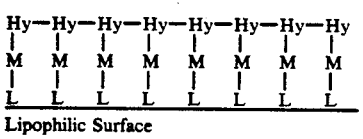
Lipophilic Surface (8c)

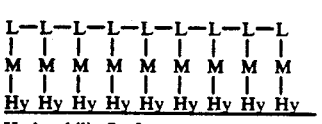
Hydrophilic Surface (8d)

It is also possible to employ as spacer layers polymeric amphiphiles which do not include molecular dipoles. It has been observed that higher levels of stability can be realized when one or more recurring amphiphile layers in an L-B layer unit are constructed using polymeric amphiphiles.

In the foregoing description only a single amphiphile layer is shown on a support. To satisfy the organic layer unit thicknesses required for the optical articles of the invention a large number of superimposed amphiphile monolayers are required. Multilayer L-B assemblies are characterized as X, Y or Z type assemblies, depending on the relative orientations of the amphiphile layers. In a Z type assembly the first amphiphile layer is oriented with the hydrophilic moiety nearest the support as shown at 4b, 5b, 7b, 8b and 8d above. The next and all subsequent amphiphile layers are deposited in the same orientation as the first amphiphile layer; that is, the hydrophilic moiety Hy is nearer the support than the lipophilic moiety L in each successive layer.

X type assemblies are similar to Z type assemblies, except that the lipophilic moiety L in each amphiphile layer is nearest the support. Thus, X type assemblies are constructed starting with the initial layer arrangements shown at 4a, 5a, 7a, 7c, 8a and 8c above. The next and all subsequent amphiphile layers are deposited in the same orientation as the first amphiphile layer; that is, the lipophilic moiety L is nearer the support that the hydrophilic moiety Hy in each successive layer.

X and Z type assemblies have the appear of structural simplicity because all successive amphiphile monomolecular layers can be identical within an L-B layer unit.

Structurally more complex Y type L-B assemblies are not only feasible in the construction of the L-B layer units, but also produce advantages in construction and stability. In Y type L-B assemblies hydrophilic moieties are deposited on hydrophilic moieties and lipophilic moieties are deposited on lipophilic moieties:

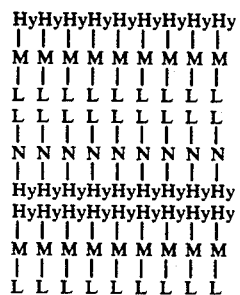
Lipophilic Surface (9a)

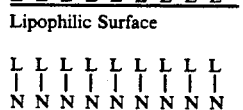 (9b)

Hydrophilic Surface

One major advantage of Y type L-B assemblies is that they place the lipophilic moieties and hydrophilic moieties in adjacent positions in the layer sequence and thereby provide a more stable L-B assembly.

However, Y type L-B assemblies require at least two different types of amphiphiles. In one preferred form, two different amphiphiles, L-M-H and L-N-H, are required, where N represents a molecular dipole having its polarity reversed as compared with the molecular dipole M. In other words, if the molecular dipole M is oriented with its electron donor group adjacent the lipophilic moiety L, the molecular dipole N is oriented with its electron acceptor group adjacent the lipophilic moiety L, so that L-M-Hy is by expanded notation L-D-E-A-Hy while L-N-Hy si by expanded notation L-A-E-D-Hy. If the same amphiphile were employed in each successive layer, a centrosymmetric structure would result in which the contribution of the molecular dipoles in each amphiphile layer to the second order polarization susceptibility, $\chi^{(2)}$, which is directly proportional to the linear electro-optic coefficient, $r_{33}$, would be cancelled by the oppositely oriented molecular dipoles int he next adjacent layer.

An alternate Y type assembly, one that permits the use of only a single type of molecular dipole containing amphiphile, can be achieved by replacing every other amphiphile monomolecular layer with a amphiphile monomolecular spacer layer lacking a molecular dipole. The spacer amphiphiles can be identical to the amphiphiles containing molecular dipoles, except that the molecular dipole M or N is replaced by linking group (S) which exhibits a second order polarizability of less than $10^{-30}$ esu. In this arrangement the following layer sequences can be employed:

Lipophilic Surface

Hydrophilic Surface

Lipophilic Surface

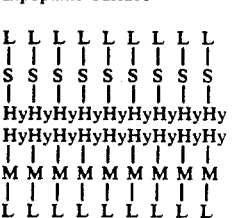

```
L L L L L L L L L
| | | | | | | | |
S S S S S S S S S
| | | | | | | | |
HyHyHyHyHyHyHyHyHy
```
Hydrophilic Surface In 9a and 9b each of the amphiphiles L-M-Hy and L-N-Hy must be capable of depositing on the other. This involves preparing an amphiphile that, in addition to exhibiting the high second order polarizability $\beta$ desired, also performs well as an L-B amphiphile in forming successive monomolecular layers. It is apparent that this requires amphiphile selection to be based on an acceptable balance of the ability of the amphiphile to perform two entirely different functions. It has been observed that amphiphiles having high $\beta$ values can perform entirely satisfactorily as deposition surfaces for other amphiphiles or when deposited on other amphiphiles, but lack the adherency required for deposition on themselves or similar amphiphiles. By having freedom to select the amphiphiles L-S-Hy in 10a–d lacking high b values from a wide range of known amphiphiles strictly on the basis of their desirability in terms of L-B layer construction capabilities, the advantage can be realized of achieving higher deposition efficiencies and hence more uniform and stable L-B assemblies. Since spacer moiety S of the L-S-Hy amphiphiles can be relatively small in relation to the molecular dipoles M and N in the L-M-Hy and L-N-Hy amphiphiles, any reduction in the value of $\chi^{(2)}$ attributable to the presence of spacer amphiphiles can be kept to a relatively low level.

In the foregoing discussion three successive amphiphile monolayer repeating units have been shown, which is the minimum number required to shown the layer sequence. In practice many more successive layers are required to complete each of the L-B layer units.

The amphiphiles used to form the L-B layer units can be made up of hydrophilic moieties (head groups) Hy, lipophilic moieties (tail groups) L and linking groups K, including both spacer groups S and molecular dipoles M, that take a variety of different forms.

The following are illustrative of amphiphiles with varied hydrophilic moieties serving as head groups:

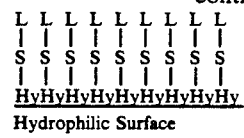  (H-1)

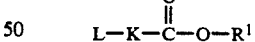  (H-2)

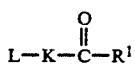  (H-3)

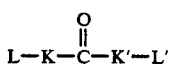  (H-4)

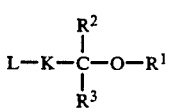

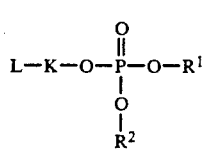  (H-5)

-continued

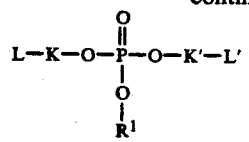 (H-6)

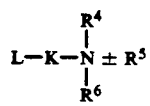 (H-7)

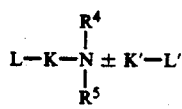 (H-8)

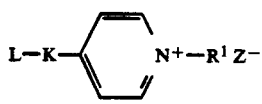 (H-9)

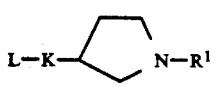 (H-10)

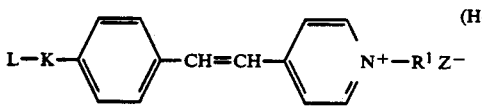 (H-11)

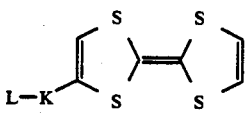 (H-12)

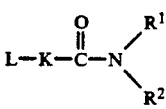 (H-13)

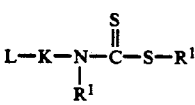 (H-14)

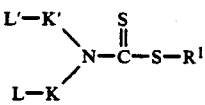 (H-15)

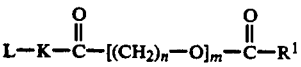 (H-16)

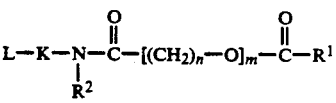 (H-17)

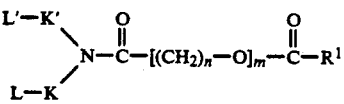 (H-18)

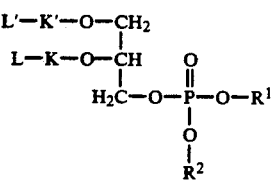 (H-19)

-continued

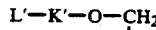 (H-20)

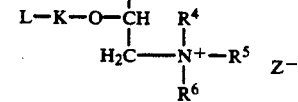

where

K and K' represent independently selected linking moieties;

L and L' represent independently selected lipophilic moieties;

m is an integer of from 1 to 20, preferably 1 to 10 and optimally from 1 to 6; n is an integer of from 1 to 6, preferably from 1 to 3 and optimally 2;

$R^1$, $R^2$ and $R^3$ are independently hydrogen or any synthetically convenient hydrocarbon or substituted hydrocarbon compatible with the desired hydrophilic character of the head group, these groups, when hydrocarbons, preferably being alkyl of from 1 to 10 carbon atoms, most preferably 1 to 5 carbon atoms. The alkyl groups can be substituted with common modifying groups, such as aryl, halo, hydroxy, alkoxy, and aryloxy moieties, where the alkyl moieties preferably contain from 1 to 3 carbon atoms and the aryl moieties contain from 6 to 10 carbon atoms (e.g., phenyl or naphthyl moieties);

$R^4$, $R^5$ and $R^6$ independently represent any of the same hydrocarbon or substituted hydrocarbon groups as $R^1$ and $R^2$ or any two together represent carbon and optionally oxygen atoms completing a 4 to 7 member ring (e.g., an azetidine, pyrrole, pyrroline, pyrrolidine, morpholine or azepine ring); and Z represents a counter ion.

In addition to the simple head groups shown above it is additionally contemplated to employ head groups that are capable also as acting the electron acceptor, indicated by the prefix HA, or electron donor, indicated by the prefix HD, of the organic molecular dipole. The following are illustrative of such groups:

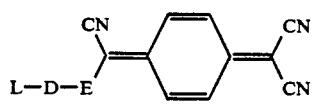 (HA-21)

L—D—E—NO$_2$ (HA-22)

L—D—E—CN (HA-23)

 (HA-24)

 (HA-25)

L—D—E—SO$_2$—CH$_3$ (HA-26)

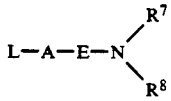 (HA-27)

where $R^7$ and $R^8$ are independently hydrogen, hydrocarbon or substituted hydrocarbon selected similarly as $R^1$ and $R^2$.

The lipophilic moieties or tail groups L are nonpolar groups. Depending upon the group to which the lipophilic moiety is attached, an alkyl group of from 1 to 3 carbon atoms (e.g., a methyl, ethyl or propyl group) can function effectively as a lipophilic moiety. Preferred lipophilic moieties are hydrocarbons that contain a least four carbon atoms, including alkyl, cycloalkyl, alkenyl groups, cycloalkenyl, aryl, alkaryl, and aralkyl moieties. To avoid excessive bulk the hydrocarbon lipophilic moieties are preferably limited to 24 or fewer carbon atoms. Alkyl and alkenyl groups of from about 4 to 20 carbon atoms are preferred. Aryl groups, such as phenyl, naphthyl and biphenyl, are specifically contemplated. Preferred cycloalkyl groups are those that contain from 5 to 7 ring carbon atoms. Halogen substitution of the hydrocarbons is recognized to increase their lipophilic properties. Fluoro-substituted hydrocarbons are specifically recognized to be highly lipophilic.

When the first and second amphiphiles are polymers and the repeating units of at least one of the amphiphile polymers contains a branched lipophilic moiety L of up to 9 carbon atoms, the optical attenuation within the organic layer unit formed by the Y type L-B assembly is exceedingly low. Specifically, optical attenuation levels are reduced to less than 2 dB/cm. It is preferred that both of the lipophilic moieties can be formed of a branched hydrocarbon of 9 or fewer carbon atoms, particularly when each of the polymeric amphiphiles forming the Y type L-B assembly contains an organic molecular dipole moiety. In a specifically preferred form the branched lipophilic moiety exhibits the structure:

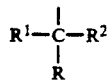 (12)

where R is hydrogen or a hydrocarbon and $R^1$ and $R^2$ represent separate hydrocarbons or together complete a cyclic hydrocarbon.

The branched lipophilic moiety can be chosen from among 2-propyl, 2-butyl, 2-(2-methylpropyl), 2-(2methyl-butyl), 2-(2-ethylbutyl), 2-(3-methylbutyl), 2-pentyl, 2-(2-methylpentyl), 2-(3-methylpentyl), 3-pentyl, 3-(2,4-dimethylpentyl), 3-(3-ethylpentyl), 2-hexyl, 2-(2-methylhexyl), 2-(3-methylhexyl), 2-(4-methyl-hexyl), 2-(3-ethylhexyl), 2-(4-ethylhexyl), 2-heptyl, 4-heptyl, 4-(3-ethylheptyl), cyclopentyl, cyclohexyl, phenyl, tolyl, xylyl, ethylphenyl, norboranyl or similar cyclic and acylic branched hydrocarbons. As noted above, corresponding halohydrocarbon and halocarbon lipophilic moieties are even more lipophilic.

When the linking groups K function merely to provide a synthetically convenient linkage between the hydrophilic moieties Hy and the lipophilic moieties L, as in the amphiphiles Hy-S-L, they can take a wide variety of forms. While the Hy and L moieties are relied upon primarily to provide ambiphilic properties, linking groups are seldom entirely neutral moieties. When the linking group is a divalent hydrocarbon moiety, the demarcation between the linking group and lipophilic moiety is, of course, arbitrary. In other instances the linking group can contain one or more polar moieties, making it hydrophilic to some degree; however, the linking group is normally chosen to be less hydrophilic than the hydrophilic moiety Hy with which it is employed. When the linking moiety contains a hydrophilic or lipophilic portion, that portion is preferably attached to the hydrophilic or lipophilic moiety, so that it supplements the hydrophilic or lipophilic moiety in providing the desired ambiphilic properties to the molecule.

The following are representative of linking groups:

 (K-1)

where n is an integer of from 1 to 24, preferably from 4 to 20;

 (K-2)

where n satisfies the K-1 definition and Z is a divalent oxy, —O—, thio '—S— or amino —N($R^1$)— linkage with $R^1$ satisfying the definition above;

 (K-3)

where $Z^1$ represents an oxy, =O, or thione, =S, atoms;

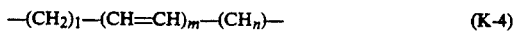 (K-4)

where l, m and n are each integers of from 4 to 20, with l+m+n preferably being no more than 20;

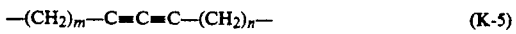 (K-5)

where m and n are each integers of from 4 to 20, with m+n preferably being from 10 to 20;

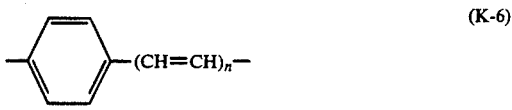 (K-6)

where n is an integer of from 1 to 10, preferably from 1 to 4;

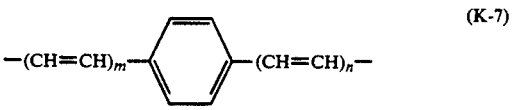 (K-7)

where m and n are each integers of from 1 to 10, preferably from 1 to 4;

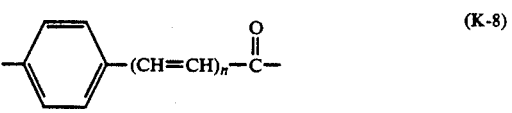 (K-8)

where n is an integer of from 1 to 10, preferably from 1 to 4;

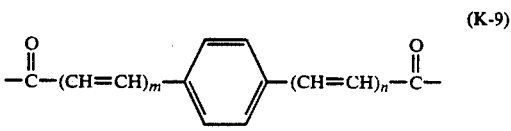 (K-9)

where m and n are each integers of from 1 to 10, preferably from 1 to 4;

(K-10)

where m is an integer of from 1 to 5, preferably 1 or 2;

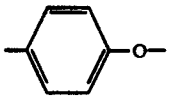
(K-11)

(K-12)

where m is an integer of from 1 to 5, preferably 1or 2;

When the amphiphile contains an organic molecular dipole, —M—, the overall structure of the amphiphile can be represented as Hy-A-E-D-L or Hy-D-E-A-L. In the majority of instances the electron acceptor moiety is itself sufficiently hydrophilic to be employed as a head group. Thus, the preferred electron acceptor moieties for forming the Hy-A-E-D-L amphiphiles are those described above identified by the prefix HA. An amine structure, HD-26, is shown above capable of acting as both a donor and a head group; however, electron donor moieties. When employed to form an Hy-D-E-A-L amphiphile, the electron donor moiety D is preferably groups identified above by the prefix H. In addition to amines, exemplary electron donor moieties contemplated include oxy, —O—, and thio, —S—, moieties directly linked to a carbon atom of E and a carbon atom of Hy or L. The amine structure of HD-26, above can be converted to a L-D-structure by replacing one or both of $R^1$ and $R^2$ with a more lipophilic group L of the type described above.

The electron acceptor —SO$_2$— particularly lends itself to forming Hy-D-E-A-L amphiphiles, since, unlike the other electron acceptors listed above, it lends itself to -A-L structures, such as

(5-1)

where $R^9$ is $R^1$ or $T^2$.

$T^1$ can be a multicarbon atom hydrocarbon or substituted hydrocarbon of the type described above for use as L groups, preferably those containing at least 5 carbon atoms and optimally at least 10 carbon atoms.

$T^2$ requires a difluoro-substituted carbon atom attached to the sulfonyl, —SO$_2$—, moiety—that is, the a carbon atom. When $R^9$ takes the form of $T^2$, the structure can be represented as follows:

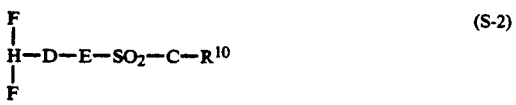
(S-2)

where $R^{10}$ can be hydrogen, fluorine, or any hydrocarbon or substituted hydrocarbon described above as being useful as a lipophilic moiety, but preferably is a hydrocarbon containing less than 10 and optimally less than 5 carbon atoms.

When the a carbon atom is difluoro substituted, the second order polarizability $\beta$ the molecule is enhanced. In addition the fluoro substituents markedly increase the hydrophobicity of the sulfonyl substituent. This allows the number of carbon atoms required to form the lipophilic moiety L to be reduced. For example, the moiety —SO$_2$CH$_3$ has been noted above to be a hydrophilic electron acceptor moiety—i.e., an HA- moiety; but the moiety —SO$_2$CF$^3$ is a lipophilic acceptor moiety—i.e., an LA- moiety. Further the trifluoromethylsulfonyl moiety is a much more efficient electron acceptor than the methylsulfonyl moiety. Additional fluoro substitutions of $\beta$ and $\gamma$ carbon atoms increase the lipophilic character of the moieties satisfying formula S-2, but make progressively smaller additional contributions to second order polarizability.

The linking group E between the electron donor D and electron acceptor A can take the form of a conjugated $\pi$ bonding linkage of any convenient type. In the linking groups described above K-6, K-7 and K-10 provide the required conjugated $\pi$ bonding linkage. The conjugated $\pi$ bonding linkages of K-4, K-8, K-9 and K-12 are, of course, not useful in forming organic molecular dipoles, since the conjugation is interrupted by one or more nonconjugated linkages. This prevents resonance between an excited state and a ground state required for useful organic molecular dipoles.

In the preferred conjugated $\pi$ boding linkages E between the electron donor D and electron acceptor A moieties the terminal portions of the linkage are aromatic. In choosing a linkage E for an organic molecular dipole a number of factors must be taken into account in addition to the conjugated $\pi$ bonding linkage. Increasing the length of the linkage tends to increase the dipole moment and is therefore beneficial, but this must be balanced against reducing the resonance efficiency of the organic molecular dipole, which occurs as the conjugated $\pi$ bonding linkage is lengthened. In practice a balance is struck which has the net effect of achieving the highest attainable second order polarizability.

Lengthening the conjugated $\pi$ bonding linkage also has the property of increasing the wavelengths of electromagnetic radiation the molecular dipole will absorb. Thus, for a specific application, the length of the conjugated $\pi$ bonding linkage is limited by $\pi$ as well as specific choices of the electron donor and acceptor moieties. Preferred linking groups produce molecular dipoles that are transparent to electromagnetic radiation in the near infrared and at least a portion of the visible spectra. Since the thickness of organic layer unit is a function of $\lambda$, it is apparent that for organic layer units of minimum thickness (and hence minimum numbers of L-B layers) preferred organic molecular dipoles are those that are transparent to light wavelengths extending into and, preferably, throughout the blue portion of the spectrum.

The following are preferred linking groups E:

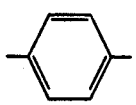
(E-1)

-continued

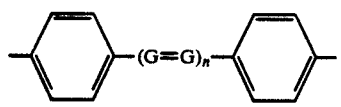
(E-2)

where G is independently in each occurrence methine or substituted methine, —CR$^{11}$—, or aza, —N=; R$^{11}$ is hydrogen or alkyl of from 1 to 3 carbon atoms; n is from 1 to 3 and optimally 1; with the further proviso that no more than two aza moieties are next adjacent.

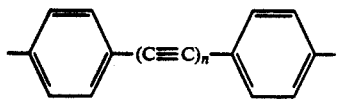
(E-3)

where n is as defined for E-2.

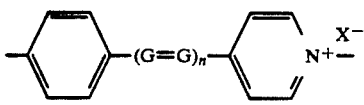
(E-4)

where G and n are as defined for E-2 and X- is a counter ion.

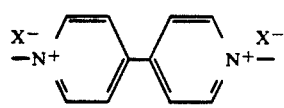
(E-5)

where X- is a counter ion.

In addition to the preferred conjugated π bonding linkages E shown above that are generally useful with terminal L-A-, Hy-A-, L-D- and Hy-D-moieties of the type described above, other preferred linking groups particularly useful with sulfonyl electron acceptor moieties of the type disclosed by Ulman et al. in U.S. Pat. No. 4,792,208, the disclosure of which is here incorporated by reference, are specifically contemplated. In the preferred linking groups E-1to E-5 no substituents to the various aromatic rings are shown. However, any of the R$^1$ and R$^d$ ring substituents of Ulman et al can be employed, if desired.

Stilbene and diazobenzene linking groups E as well as their pyridinium analogues have been observed to provide an optimum balance of synthetic convenience and optical advantages. The following are illustrations of organic molecular dipoles of employing these types of linking groups that have been observed to be particularly useful:

(MD-1) 4-(N-Methyl-N-octadecylamino)-4'-nitrostilbene
(MD-2) 4-(N,N-Dioctadecylamino)-4'-methylsulfonylstilbene
(MD-3) 4-{2-[4-(N,N-Dimethylamino)phenyl]ethenyl}-N-octadecylpyridinium chloride
(MD-4) 4-{2-[4-(N,N-Dimethylamino)phenyl]ethenyl}-N-docosanylpyridinium sulfate
(MD-5) 6-{N-methyl-N-[4-(4'-octadecylsulfonyl)stilbene]amino}hexanoic acid
(MD-6) 4-(N-Methyl-N-(3,6-dioxyoctan-8-ol)amino-4'-octadecylsulfonylstilbene Preferred L-B spacer units H-S-L are saturated and mono-unsaturated fatty acids containing from 16 to 24 carbon atoms, including hexadecanoic, octadecanoic, eicosanoic, docosanoic, 22-tricosenoic and tetradecanoic acids. Posphates, such as [CH$_3$(CH)$_{12}$(CH=CH)$_2$C(O)O(CH$_6$)O]$_2$P(O)OH and [CH$_3$(CH)$_4$OC(O)CH=CH(p-C$_6$H$_4$)CH=CH)C(O)O(CH$_6$)—O]$_2$P(O)OH, are specifically contemplated for use as spacer units.

The foregoing elaboration of preferred amphiphiles has focused on monomeric structures. As noted above, it is also possible to employ polymeric amphiphiles. Polymeric amphiphiles offer advantages in layer stability. Polymers that are lipophilic in character can be transformed into amphiphiles by including one or more Hy-K- pendant groups, where the designation Hy-K- indicates the various forms of these groups described above. Similarly polymers that are hydrophilic in character can be transformed into amphiphiles by including one or more L-K- pendant groups, where the designation L-K- indicates the various forms of these groups described above.

The following are representative polymeric amphiphiles contemplated for use in forming L-B layer units:

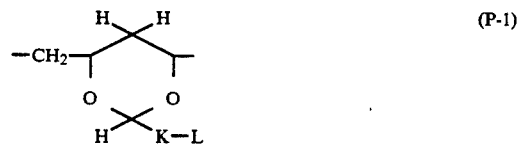
(P-1)

(P-2)

where Z$^z$ represents -L or -K-L and Z$^z$ represents hydrogen, methyl, ethyl or cyano;

(P-3)

where R$^y$ represents -L or -K-L when Z$^y$ is hydrogen or alkyl of from 1 to 3 carbon atoms and Z$^y$ represents -L or -K-L when R$^y$ is hydrogen or alkyl of from 1 to 3 carbon atoms;

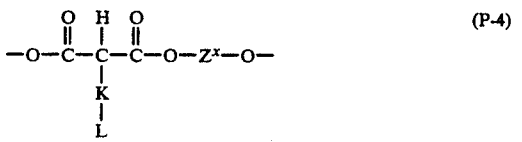
(P-4)

where Z$^x$ represents a divalent hydrocarbon containing from 1 to 12 carbon atoms (e.g., an alkanediyl, an alkenediyl, a cycloalkenediyl, phenylene, etc.);

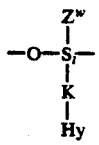 (P-5)

where $Z^w$ represents a hydrocarbon group of from 1 to 12 carbon atoms (e.g. alkyl or phenyl);

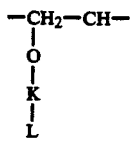 (P-6)

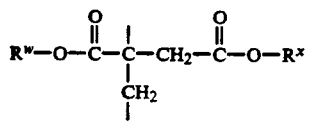 (P-7)

where one of $R^w$ and $R^x$ represents -K-L with the other being -K'-L' or any synthetically convenient lipophilic (-L) or hydrophilic (-Hy) moiety;

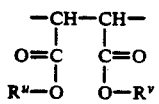 (P-8)

where one of $R^u$ and $R^v$ represents -K-L with the other being -K'-L' or any synthetically convenient lipophilic (-L) or hydrophilic (-Hy) moiety;

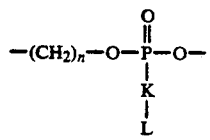 (P-9)

where n is an integer of from 2 to 4;

 (P-10)

where one of $R^s$ and $R^t$ represents -K-L with the other being -K'-L' or any synthetically convenient lipophilic (-L) or hydrophilic (-Hy) moiety;

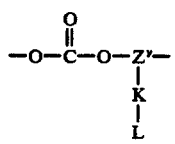 (P-11)

where $Z^v$ represents a trivalent hydrocarbon group of from 1 to 10 carbon atoms (e.g., a -K-L substituted alkanediyl or phenylene);

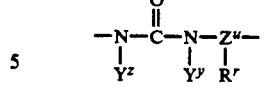 (P-12)

where at least one of $R^r$, $Y^y$ and $Y^z$ is -K-L and with any of $R^r$, $Y^y$ and $Y^z$ that are not -K-L being any synthetically convenient atom or group (e.g. hydrogen or alkyl or aryl of from 1 to 10 carbon atoms) and $Z^u$ represents a trivalent hydrocarbon group of from 1 to 10 carbon atoms (e.g., a substituted alkanediyl or phenylene);

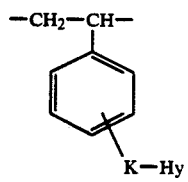 (P-13)

 (P-14)

where at least one $R^p$ and $R^q$ is -K-K and the remaining of $R^p$ and $R^q$ is -K'-H' or any synthetic convenient lipophilic, -L, or hydrophilic, -Hy, moiety;

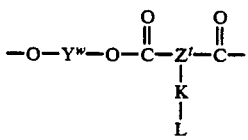 (P-15)

where $Y^w$ is a divalent hydrocarbon of from 1 to 12 carbon atoms (e.g. alkanediyl or phenylene) and $Z^t$ represents a trivalent hydrocarbon group of from 1 to 10 carbon atoms (e.g., a substituted alkanediyl or phenylene);

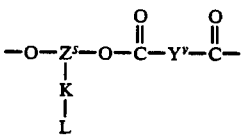 (P-16)

where $Y^v$ is a divalent hydrocarbon of from 1 to 12 carbon atoms (e.g., alkanediyl or phenylene) and $Z^s$ represents a trivalent hydrocarbon group of from 1 to 10 carbon atoms (e.g., a substituted alkanediyl or phenylene);

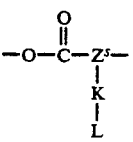 (P-17)

where $Z^s$ is as previously defined;

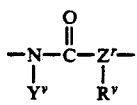 (P-18)

where $R^y$ represents -K-L when $Y^y$ is hydrogen or alkyl of from 1 to 3 carbon atoms and $Y^y$ represents -K-L when $R^y$ is hydrogen or alkyl of from 1 to 3 carbon atoms and $Z^r$ represents a trivalent hydrocarbon group of from 1 to 10 carbon atoms (e.g., a substituted alkanediyl or phenylene);

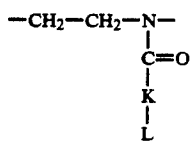 (P-19)

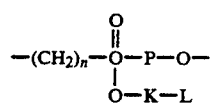 (P-20)

where n is the integer of 2, 3 or 4;

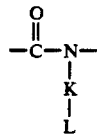 (P-21)

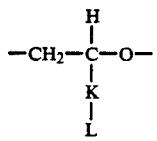 (P-22)

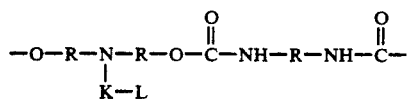 (P-23)

where R is —$(CH_2)_n$— or —$(CH_2OCH_2)_m$— and n and m are integers of from 1 to 6;

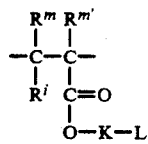 (P-24)

where $R^i$, $R^m$ and $R^{m'}$ can be independently hydrogen or any synthetically convenient hydrophilic, -Hy, or lipophilic, -L, moiety;

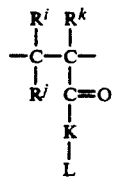 (P-25)

where $R^i$, $R^j$ and $R^k$ can be independently hydrogen or any synthetically convenient hydrophilic, -Hy, or lipophilic, -L, moiety;

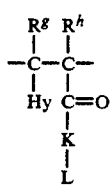 (P-26)

where $R^g$ and $R^h$ can be independently hydrogen or any synthetically convenient hydrophilic, -Hy, or lipophilic, -L, moiety;

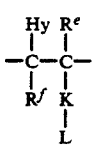 (P-27)

where $R^e$ and $R^f$ can be independently hydrogen or any synthetically convenient hydrophilic, -Hy, or lipophilic, -L, moiety;

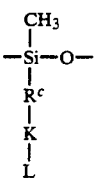 (P-28)

where $R^c$ is any synthetically convenient divalent hydrocarbon of from 1 to 12 carbon atoms (e.g., alkanediyl or phenylene).

The following are illustrative of polymers containing H-M-L repeating units linked through either the -H or -L moieties:

(PM-1)
Poly{4'-N-methyl-N-[2-(2-acryloyloxethoxy) eth-oxy]-ethylamino-4-octadecylsulfonyl azobenzene}

(PM-2)
Poly{4'-N-methyl-N-[2-(2-acryloyloxethoxy) eth-oxy]-ethylamino-4-octadecylsulfonyl azobenzene-co-2-hydroxyethyl acrylate}[1:4–6 mole ratio]

(PM-3)
Poly{4'-dioctadecylamino-4-(6-acryloyloxy) hexyl-sulfonyl azobenzene-co-2-hydroxyethyl acrylate}[1:4–6 mole ratio]

(PM-4)
Poly{4'-N-methyl-N-(8-acryloyloxy)octylamino-4-octadecylsulfonyl azobenzene-co-N,N-dimethyl acryl-amide}[1:4–6 mole ratio]

(PM-5)
Poly{N-[2-(hexamethyleneiminocarbonyloxy) ethyl]-N-[2-(iminocarbonyloxy)ethyl]-N-[4-(4'-octa-decyl-sulfonylazobenzene]amine}

The following are illustrative of polymers containing H-S-L repeating units linked through either the -H or -L moieties:

(PS-1)
Poly(t-butyl methacrylate)
(PS-2)
Poly(i-butyl methacrylate)
(PS-3)
Poly[2-(methacryloyloxy)ethoxysuccinoyl-N,N-di-octadecylamide-co-2-hydroxyethyl acrylate][5–10:1 mole ratio]

(PS-4)
Poly[oxy(dioctadecyl)malonyloxyethyloxyethyl]
(PS-5)
Poly[oxyadipolyoxy(2,2-dioctadecyl) propylene]
(PS-6)
Poly[oxycarbonyliminehexamethyleneimino carbonyloxy(2,2-diotadecylpropylene)]
(PS-7)
Poly($\gamma$-methyl-L-glutamate-co-$\gamma$-n-octadecylglutamate)

From a review of the various polymers listed above it is apparent that in most instances the hydrophilic and lipophilic moieties can be present before polymerization. It therefore follows that in most instances the monomers from which the polymers are formed are themselves amphiphiles. The degree of polymerization can vary widely, ranging from dimers through oligomers and lower molecular weight polymers with maximum molecular weights being limited only by the ability of the polymers to retain their fluid properties under L-B assembly construction conditions. It is generally preferred to employ polymers that have molecular weights of less than about 20,000. The polymers can be homopolymers or polymers that contain mixtures of repeating units with compatible Langmuir-Blodgett film-forming properties.

The major surface 105 of the layer on which the organic layer unit is formed can take any convenient conventional form. The support portion can be chosen so that the major surface is either hydrophilic or hydrophobic, thereby allowing the desired orientation of the L-B layer on the major surface. When the support is not itself initially transparent to $\lambda$ and of a lower refractive index than the L-B layer, it is recognized that a conventional buffer layer can be employed to correct these deficiencies. Buffer layers of the type disclosed in U.S. Pat. Nos. 4,946,235; 4,948,225; 4,955,977 and 4,971,426, the disclosures of which are here incorporated by reference, are specifically contemplated.

EXAMPLES

The invention described and appreciated by reference to the following specific Examples. The Examples demonstrate the feasibility and advantages of constructions incorporating Y type L-B assemblies and the inferiority of X and Z type L-B assemblies.

In each of the Examples, preparations of Langmuir-Blodgett layer units were carried out using a commercial Langmuir two compartment trough mechanically equipped to transfer the substrate from one trough to the other, either while submerged in water contained in the reservoir or while held above the liquid reservoir. This permitted deposition on the substrate of different materials in each the two compartments in sequence permitting the film in each compartment to provide multiple layers on the substrate as the operation was repeated.

In some of the examples, evidence of nonlinear optical activity was measured by second harmonic generation (SHG). It will be appreciated that SHG is also a measure of the absolute magnitude of the linear electro-optic coefficient $r_{33}$.

EXAMPLE 1

The purpose of this example is to demonstrate the capability of successful formation of a Y-type L-B assembly like 10c above with polymer amphipiles.

In one compartment a polymeric amphiphile PM-2 (hereinafter referred to as Film A) was dissolved in chloroform, spread on the surface of a pool of pure water and compressed. The amphiphile PM-2 can be schematically represented as Hy-D-E-A-L, where polymerization was through the Hy moiety.

In the other compartment polymeric amphiphile PS-1 (hereinafter also referred to as Film B) was dissolved in chloroform, spread on the surface of a pool of pure water and compressed. The polymeric amphiphile PS-1 can be schematically represented as Hy-S-L, where polymerization was through the Hy moiety.

Alternate deposition of PM-2 and PS-1 onto a silicon substrate made hydrophobic by reaction with octadecyl trichlorosilane by standard procedures was performed in a Film B before Film A (B/A) sequence fashion until six B/A bilayers were deposited. Six B layers were then deposited on top of the B/A layers.

This film was measured ellipsometrically where thickness varied less than 5% across the film and was (302 Å) which is within 10% of expected values based on ellipsometric measurement of films A and B individually.

Second Order nonlinear optical activity was measured by Second Harmonic Generation (SHG) in reflection mode using 1064 nm input wavelength and measuring output intensity at 532 nm using an optical system similar to that reported frequently in the literature, which showed an increase in signal intensity, +3.25 volts relative to the uncoated substrate.

EXAMPLE 2 (a control)

The purpose of this example is to illustrate the deposition advantage achieved in Example 1 by employing the spacer amphiphiles (PS-1). The procedure of Example 1 was repeated, except that no spacer amphiphile PS-1 was employed. Instead, a first layer of PM-2 was deposited on the substrate, followed directly by second, third and subsequent layers of the same amphiphile, with layer thickness measurements being undertaken after each layer deposition.

Observations revealed that PM-2 failed to adhere to itself resulting in a failure to produce a multilayer structure. This failure can be expressed as the Film Transfer Ratio (FTR), which is a measurement of monolayer uptake by the substrate, where a complete layer should equal a ratio of 1.0. For the initial monolayer, the FTR was 1.01. For the second layer the FTR was only 0.08. Deposition of the third layer revealed an FTR of 0.749. Film thickness characterization was measured by ellipsometry. Sample thickness measured for the initial monolayer was (32 Å+1 Å). The thickness after the third layer deposition cycle varied randomly across the substrate between (41 Å and 83 Å). At no point on the film did the thickness reach the expected value of 96 Å) for a 3-layer film.

EXAMPLE 3

The purpose of this example is to demonstrate the feasibility of substituting an Hy-A-E-D-L amphiphile for an Hy-D-E-A-L amphiphile. A procedure similar to that described in Example 1 was employed, except that the amphiphile PM-3 was substituted for PM-2. The amphiphile PM-3 can be schematically represented as Hy-A-E-D-L, where polymerization was through the Hy moiety. The significant difference in the amphiphile PM-3 as compared to PM-2 was the reversed orientation of the molecular dipole A-E-D in the polymer side chain.

Designating the PM-3 amphiphile layers as Film A and PS-1 amphiphile layers as Film B, alternate deposition of these two materials onto a silicon substrate made hydrophobic by reaction with octadecyl trichlorosilane by standard procedures was performed in A/B fashion until an ABABA sequence of five layers had been deposited.

Film layer thickness measurements revealed that the layers were well formed, showing feasibility of employing PM-3 and PS-1 in combination to form an L-B layer unit.

EXAMPLE 4 (A CONTROL)

The purpose of this Example is to demonstrate the advantage of depositing the spacer amphiphile PS-1 on itself as compared to the amphiphile PM-3. Onto the ABABA layer sequence of Example 4 an additional A layer was deposited to permit the subsequent deposition of B layers with inverted orientations. In other words, after depositing to two AB bilayers, two A layers were deposited, to permit subsequent deposition of BA bilayers.

The last A layer of the initial five layer sequence exhibited an FTR of 0.9. The A layer deposited directly on the last A layer (the sixth layer overall) exhibited an FTR of 0.98. However, the next deposited B layer (the seventh layer overall) exhibited and FTR of −0.5, indicating removal of a portion of the preceding A layer. The next A layer (the eighth layer overall) exhibited an FTR of 1.0, with the next B layer (the ninth layer overall) again exhibiting an FTR of −0.5.

The thickness measured by ellipsometry for this film after 10 deposition strokes was (131 Å). Based on thickness measurements of the individual materials the thickness of such a film should be (232 Å). In fact the thickness is only (15 Å), greater than calculated for layers 1 through 5 showing that the second half of the film structure did not form.

EXAMPLE 5

The purpose of this Example is to demonstrate the preparation of a thicker L-B layer unit. The procedure of Example 1 employed to produce 93 B/A bilayers in which PM-2 was employed to form the A layers and PS-2 was employed to form the B layers.

Film thickness characterization was measured by ellipsometry (thickness variability) and second order nonlinear optical activity was measured by SHG in a reflection mode using a 1064 nm input wavelength and measuring output intensity at 532 nm using a conventional optical system. Sample thickness varied less than 5% across this film and was (3991 Å), which is within 5% of expected thickness based on the ellipsometric measurement of films of A and B individually. Film characterization by SHG showed a higher signal relative to thinner films. This corroborated a greater thickness.

EXAMPLE 6

The purpose of this example is to demonstrate the preparation of a thicker L-B layer unit. The procedure of Example 5 was repeated to produce an L-B layer unit containing 131 B/A bilayers, with PM-1 being employed to form the A layers and PS-2 being employed to form the B layers.

This film was visually clear and was tested for its ability to guide light. Polarized light from a Helium-Neon laser at 633 nm was coupled into the film through a prism by mechanical contact with the glass substrate. This film was able to guide light, with a propagation streak the entire length of the sample (over 3 cm). Attenuation of the Light beam was measured to be approximately 1 dB/cm of film length.

EXAMPLE 7

This example has as its purpose to demonstrate the preparation of a thicker L-B layer unit with variances in substrate and amphiphiles. The procedure of Example 6 was repeated to produce an L-B layer containing 124 B/A bilayers, with PM-2 being employed to form the A layers and PS-1 being employed to form the B layers. The substrate was soda-lime glass coated with a 1500 to 2000 Å layer of indium tin oxide (ITO). The layer sequence was completed by six B layers, demonstrating the self-adherency of PS-1.

EXAMPLE 8

This example has as its purpose to demonstrate the efficiency of a monomeric spacer amphiphile. This example also further illustrates the capability of controlling L-B layer unit thicknesses and to obtain thicknesses that correlate well with those expected from individual layer thicknesses.

Preparation of an L-B layer unit was carried out using arachidic acid (i.e., eicosanoic acid) and methyl arachidate together as H-S-L monomeric spacer amphiphiles to form A films. Arachidic acid and methyl arachidate were dissolved in chloroform in a 9:1 molar ratio, spread on water and compressed into a monolayer film. The water was pure with a 0.003 M concentration of cadmium ion added, which converted arachidic acid to cadmium arachidate. Three layers of the A film were deposited onto a hydrophilic silicon substrate for a length of 52 mm. A fourth layer of the A film was deposited for a length of 42 mm. The film layer at the air/water interface was removed by aspiration after film deposition. PM-1 was dissolved in chloroform, spread on the same water solution and compressed into a monolayer B film. The B film was depositing onto the existing A film layers, creating an A/B bilayer with the fourth cadmium arachidate and methyl arachidate layer. After deposition, the B film layer was also removed from the air/water interface. Arachidic acid and methyl arachidate in chloroform were again spread and compressed into a monolayer A film and deposited onto the exiting film structure, this time for a length of 32 mm. PM-1 in chloroform was spread, compressed into a monolayer B film and deposited onto the existing film layer structure, creating two A/B bilayers. A third A/B Bilayer was deposited in the same manner as the second A/B bilayer. A bilayer of cadmium arachidate was deposited on top of the film for a length of 18 mm creating a step film structure with the following relative (not-to-scale) architecture:

```
AAAAAAA
AAAAAAA
BBBBBBBBBBB
AAAAAAAAAAA
BBBBBBBBBBB
AAAAAAAAAAA
BBBBBBBBBBBBBBB
AAAAAAAAAAAAAAA
AAAAAAAAAAAAAAAAAAA
```

-continued
AAAAAAAAAAAAAAAAAAAAAA
AAAAAAAAAAAAAAAAAAAAAA
Substrate

Film thickness characterization was measured by ellipsometry (thickness variability). Sample thickness varied less than 5% across each film step (89 Å, 146 Å, 272 Å, and 328 Å) and was within 5% of overall expected thickness (326 Å) based on the ellipsometric measurement of monolayers of A and B individually.

EXAMPLE 9

The purpose of this example is to demonstrate the capability of forming a Y type Langmuir-Blodgett assembly like that of 9a above, but with polymer amphiphiles. By being able to employ molecular dipole containing amphiphiles in next adjacent layers of the L-B layer the potential exists for a four-fold increase in conversion efficiency as compared to employing a spacer amphiphile in alternate monomolecular layers.

PM-3 was dissolved in chloroform, spread on pure water and compressed into a monolayer A film. The A film was deposited onto a silicon substrate, which was made hydrophobic by reaction with octadecyl trichlorosilane by standard procedures. The film was deposited as a monolayer for a length of 60 mm. The A film layer at the air/water interface was removed by aspiration after film deposition. PM-1 was dissolved in chloroform, spread on pure water and compressed into a monolayer B film. The B film was deposited onto the existing A film layer, creating an A/B bilayer. After deposition, this film layer was also removed from the air/water interface. PM-3 in chloroform was again spread and compressed into a monolayer A film and deposited onto the existing A/B bilayer for a length of 42 mm. PM-1 in chloroform was spread, compressed into a monolayer film and deposited onto the existing film layer structure, creating two A/B bilayers. A third A/B bilayer was deposited in the same manner as bilayers 1 and 2, only for a length of 33 mm. A fourth A/B bilayer was deposited, similar to bilayers 1, 2, and 3, for a length of 23 mm, creating a step film architecture.

Film thickness characterization was measured by ellipsometry (thickness variability) and second order nonlinear optical activity by SHG in a reflection mode using a 1064 nm input wavelength and measuring output intensity at 532 nm using a conventional optical system. Sample thickness varied less than 5% across each bilayer (67 Å, 152 Å, 223 521 , and 290 Å respectively) and was within 10% of overall expected thickness (272 Å) based on the ellipsometric measurement of monolayers of A and B individually. Film characterization by SHG showed incremental signal enhancement relative to the bilayer increments, as well as film uniformity for each bilayer.

While the invention has been described with particular reference to an integrated optical head, it will be understood by those skilled in the art that various changes may be made and equivalents may be substituted for elements of the preferred embodiments without departing from invention. In addition, many modifications may be made to adapt a particular situation and material to a teaching of the invention without departing from the essential teachings of the present invention.

As is evident from the foregoing description, certain aspects of the invention are not limited to the particular details of the examples illustrated, and it is therefore contemplated that other modifications and applications will occur to those skilled in the art. It is accordingly intended that the claims shall cover all such modifications and applications as do not depart from the true spirit and scope of the invention.

10: waveguide optical read/write head
11: laser diode
12: optical disk
13: collimating lens
14: objective lens
16: collimated beam
17: quarter-wave plate
18: polarization beam splitter
19: linear polarization state of light incidentonquater-wave plate 17
20: beam
21: linearly polarized light rotated 90 degrees relative to the polarization state 19
22: planar wavefronts
24: Relative movement (indicated by arrow 24)
26: curved wavefronts
28: grating
30: planar optical waveguide
32: substrate
34: transparent buffer layer
36: optical axis
38: line
40: beam 40 in waveguide 30
42: center channel
44: waveguide lens
46: waveguide photodetector
48: channel guide on one side of center guide 42
48": Ti-exchanged channel
50: channel guide on one side of center guide 42
52: channel guide on one side of center guide 42
54: channel guide on other side of center guide
56: channel guide on other side of center guide
58: channel guide on other side of center guide
60: M-Z interferometer
62: M-Z interferometer
64: photodetector
66: photodetector
68: photodetector
70: photodetector
72: non-guiding (lower index) glass
74: thin film of electrooptic L-B material
75, 75', 75 ": transparent buffer layer
76: electrode
78: electrode
80: contact pad
82: contact pad
84: electrode
86: electrode
90: electro-optic phase modulator
92: M-Z channel waveguide interferomter
92': outer M-Z interferometer
94: M-Z channel waveguide interferometer
94': outer M-Z interferometer
96: M-Z channel waveguide interferometer
96': central M-Z interferometer
98: M-Z channel waveguide interferometer
100: waveguide lens
102: waveguide lens
104: waveguide lens
105: surface
106: electrode
110: electro-optic channel guide 116: electrode
120: electro-optic channel guide

What is claimed is:

1. An integrated optical head having an optical axis and capable of reading from an optical data storage disk, comprising:
   channels formed in said optical head forming first and second interferometers;
   first and second phase-shiftable channel waveguides formed on a waveguide layer and respectively associated with one channel waveguide branch of each said first and second interferometers;
   first and second channel detectors respectively positioned to detect light emanating from said first and second interferometers;
   a single waveguide condensing lens positioned along the optical axis of said optical head; and
   a condensing lens detector to detect light emanating from said condensing lens;
   control electrodes associated with said interferometers for electro-optical phase shifting of light signal in one said branch with respect to the light signal in the other branch, said phase-shiftable channel waveguide being formed, at least partially, of Langmuir-Blodgett thin film electro-optic polymeric material.

2. An integrated optical head, as set forth in claim 1, including a silicon substrate.

3. An integrated optical head, as set forth in claim 2, wherein said interferometers are formed on said silicon substrate and wherein said phase-shiftable channel waveguides are formed, at least partially, of Langmuir-Blodgett thin-film electro-optic polymeric material deposited on the waveguide layer on top of said silicon substrate.

4. An integrated optical head, as set forth in claim 2, including a buffer layer, and wherein said interferometers are formed on said silicon substrate and wherein said phase-shiftable waveguide channels are formed, at least partially, of Langmuir-Blodgett thin-film electro-optic polymeric material deposited on the buffer layer on top of said silicon substrate.

5. An integrated optical head, as set forth in claim 1, wherein said interferometers are formed on a silicon substrate and wherein said phase-shiftable channel waveguides are formed, at least partially, of Langmuir-Blodgett thin-film electro-optic polymeric material deposited on the waveguide and/or buffer layers on top of the silicon substrate.

6. An integrated optical head, as set forth in claim 1, wherein said interferometers are formed on a silicon substrate and wherein said phase-shiftable channel waveguides are formed on a Langmuir-Blodgett thin-film electro-optic polymeric material deposited on the silicon substrate and interposed between said control electrodes and said substrate.

7. An integrated optical head, as set forth in claim 6, including a buffer layer interposed between said Langmuir-Blodgett thin-film electro-optic polymeric material and said control electrodes.

8. An integrated optical head, as set forth in claim 1, further comprising:
   channels formed in said optical head forming first and second reference waveguide channels;
   third and fourth channel detectors respectively positioned to detect light emanating from said first and second reference waveguide channels which are closer to the optical axis than said first and second interferometers.

9. An integrated optical head, comprising:
   first and second channels formed in said optical head forming an interferometer that has branches; and
   control electrodes associated with one of said first and second branches of said interferometer for electro-optical phase shifting of light signal in one said branch with respect to the light signal in the other branch, said associated electrodes branch forms a phase-shiftable channel waveguide having organic nonlinear optical materials formed as Langmuir-Blodgett films.

10. An integrated optical head, as set forth in claim 9, wherein said interferometer is formed on a silicon substrate and wherein each said phase-shiftable channel waveguide is formed of Langmuir-Blodgett thin-film electro-optic polymeric material deposited on the silicon substrate.

11. An integrated optical head, as set forth in claim 9, wherein said interferometer is formed on a silicon substrate and wherein each said phase-shiftable channel waveguide is formed on a Langmuir-Blodgett thin-film electro-optic polymeric material deposited on the silicon substrate and interposed between said control electrode and said substrate.

12. An integrated optical head, as set forth in claim 11, including a buffer layer interposed between said Langmuir-Blodgett thin-film electro-optic polymeric material and said control electrode.

13. An integrated optical head having an optical axis and capable of reading from an optical data storage disk, comprising:
   channels formed in said optical head forming first, second and third interferometers;
   first and second phase-shiftable channel waveguides formed on a waveguide layer and respectively associated with one channel waveguide branch of each said first and second interferometers;
   said third interferometer positioned along the optical axis of said optical head;
   first, second and third channel detectors respectively positioned to detect light emanating from said first, second and third interferometers;
   two waveguide condensing lenses positioned along said third interferometer;
   condensing lens detectors to detect light emanating from said condensing lenses; and
   control electrodes associated with said interferometers for electro-optical phase shifting of light signal in one said branch with respect to the light signal in one said branch with respect to the light signal in the other branch, said phase-shiftable channel waveguide being formed, at least partially, on Langmuir-Blodgett thin film electro-optic polymer material.

* * * * *